US012649237B2

(12) United States Patent
Holhjem et al.

(10) Patent No.: US 12,649,237 B2
(45) Date of Patent: Jun. 9, 2026

(54) MOTION PLANNING

(71) Applicant: ZIVID AS, Oslo (NO)

(72) Inventors: Øystein Hov Holhjem, Oslo (NO); Gudbrand Eggen, Oslo (NO); Torstein Anderssen Myhre, Oslo (NO)

(73) Assignee: ZIVID AS, Oslo (NO)

( * ) Notice: Subject to any disclaimer, the term of this patent is extended or adjusted under 35 U.S.C. 154(b) by 254 days.

(21) Appl. No.: 18/269,325

(22) PCT Filed: Dec. 21, 2021

(86) PCT No.: PCT/GB2021/053396
§ 371 (c)(1),
(2) Date: Jun. 23, 2023

(87) PCT Pub. No.: WO2022/136865
PCT Pub. Date: Jun. 30, 2022

(65) Prior Publication Data
US 2024/0051136 A1 Feb. 15, 2024

(30) Foreign Application Priority Data
Dec. 23, 2020 (GB) ..................................... 2020505

(51) Int. Cl.
*B25J 9/16* (2006.01)
(52) U.S. Cl.
CPC ............. *B25J 9/1666* (2013.01); *B25J 9/163* (2013.01)
(58) Field of Classification Search
None
See application file for complete search history.

(56) References Cited

U.S. PATENT DOCUMENTS 10,286,551 B2 5/2019 Inaba et al.
2019/0232496 A1 8/2019 Graichen et al.
(Continued)

FOREIGN PATENT DOCUMENTS

WO WO-2019/156984 A1 8/2019
WO WO-2020/040979 A1 2/2020
(Continued)

OTHER PUBLICATIONS

International Search Report and Written Opinion, International Application No. PCT/GB2021/053396, mailed Apr. 13, 2022.
(Continued)

*Primary Examiner* — Arslan Azhar
(74) *Attorney, Agent, or Firm* — MARSHALL, GERSTEIN & BORUN LLP

(57) ABSTRACT

A method of performing motion planning for a robot in a workspace discretized into workspace elements includes generating or receiving a first model and determining a first set comprising one or more workspace elements that are at least partially in collision with the first model for each of a plurality of states and the respective transition(s) between those states. A first mapping is generated including information regarding the first set and the respective states and transition(s). The method further includes generating or receiving a second model extending from the first model and determining a second set including one or more further workspace elements, additional to those in the first set, that are at least partially in collision with the second model for each of the plurality of states and transitions between those states. A second mapping including information regarding said second set and the respective states and transition(s) is generated.

20 Claims, 12 Drawing Sheets

(56) References Cited

U.S. PATENT DOCUMENTS

| | | | |
|---|---|---|---|
| 2019/0351550 A1* | 11/2019 | Fujii | B25J 9/1666 |
| 2020/0086486 A1 | 3/2020 | Graichen et al. | |
| 2021/0308866 A1* | 10/2021 | Zhu | B25J 9/1666 |

FOREIGN PATENT DOCUMENTS

| | | |
|---|---|---|
| WO | WO-2020/117958 A1 | 6/2020 |
| WO | WO-2020/214723 A1 | 10/2020 |

OTHER PUBLICATIONS

Leven et al., A Framework for Real-time Path Planning in Changing Environments, The International Journal of Robotics Research, 21(12): 999-1030 (Dec. 2002).
Schumann-Olsen et al., Parallel Dynamic Roadmaps for Real-Time Motion Planning in Complex Dynamic Scenes, 3rd Workshop on Robots in Clutter (2014).
Search Report, GB Application No. 2020505.0, dated May 28, 2021.
Yang et al., HDRM: A Resolution Complete Dynamic Roadmap for Real-Time Motion Planning in Complex Scenes, IEEE Robotics and Automation Letters, 3(1): 551-558 (Jan. 2018).

* cited by examiner

MOTION PLANNING

TECHNICAL FIELD

The present invention relates to motion planning for a robot, particularly though not exclusively for collision detection and prevention for a robot having multiple links such as a robot arm.

BACKGROUND

In recent years, there has been an ever-increasing interest in robotics, and in particular to flexible robots in which the robot has the ability to adapt to changing environments, ideally under real time conditions. This is of particular interest in collaboration settings, for example where the robot is to work alongside humans, in which the environment may be unpredictable.

It is a common aim in robotics to carry out motion planning, i.e. to determine a suitable path for a robot to take in order to move from one position or state to another within an environment, characterised as a 'workspace'.

This may, for example, involve a robot arm moving to a bin containing objects that require sorting, picking up one of the objects, moving that object to another suitable container, and then returning either to the bin or to some other position. In order to carry out this process, a path must be planned for the robot that passes through each of these states (i.e. at the base, at the bin, and at the receiving container) via suitable transitions. This process is referred to generally in the art as 'motion planning'.

When motion planning for a robot, there are a number of considerations involved. It is preferable for the robot to move smoothly and efficiently between the states. The robot may need to interact with objects in the surrounding environment as outlined above. However, in many applications, it is also important for the robot to not collide with obstacles in the environment, e.g. static objects in the environment, dynamic targets (such as humans, animals, or other robots), and itself ('self-collision). Thus, it is generally an aim to plan a suitable path that lets the robot safely and effectively carry out a particular task. Of course, in some applications collision may be wanted, for example if the robot is used to push a button or open a door.

A common strategy in motion planning is to generate a 'roadmap', or a 'graph', consisting of several nodes and edges, where each node in the roadmap represents one or more variables that correspond to the state of the robot, as outlined in further detail below. The edges of the graph that connect these nodes represent the transitions between the states. Graph searching techniques, known in the art per se, can be used to find the desired motion.

The 'configuration' of a robot corresponds to the joint angles, typically described using a vector having an element (i.e. entry in the vector) for each joint, where each element corresponds to a degree of freedom and thus the vector typically has the same number of elements as the number of joints.

The 'pose' of the robot corresponds to the position and orientation of the end-effector, which may have, for example, 6 degrees of freedom. The pose can be calculated from the configuration. A given pose can often be realised by several configuration (if number of joints is more than 6, there are typically infinite number of configurations that can realise a given pose).

The 'configuration space' (or 'C-space') typically has the same number of dimensions as the number of joints.

The term 'state' as used herein in relation to the robot may include one or more of the configuration of the robot, the velocity of the robot (or a part of the robot) and time. The term 'transition' is used to mean a transition between those different states (i.e. a change in position, velocity, time, etc.)

The workspace (i.e. the representation of the robot's environment) is generally discretized into a number of 'workspace elements', where these may be voxels, pixels, cells, or similar. An exemplary approach known in the art to allow efficient invalidation of motions during online motion planning is the 'Dynamic Roadmap' (DRM) approach described in 'P. Leven and S. Hutchinson, "A framework for real-time path planning in changing environments," The International Journal of Robotics Research, 2002', which includes generating a 'mapping' between the discretized workspace and the roadmap. The mapping can be constructed offline, and includes information regarding which nodes and edges would cause a collision (generally wholly or partially) with which workspace elements. A further approach is described in 'Schumann-Olsen, H., Bakken, M., Holhjem, Ø. H. and Risholm, P., 2014. Parallel dynamic roadmaps for real-time motion planning in complex dynamic scenes. In 3rd Workshop on Robots in Clutter, IEEE', referred to as a 'Parallel DRM' (PDRM) approach, which describes how to construct and exploit a 'structured roadmap'.

During a subsequent online planning process, the mapping can be used as a lookup table, and any nodes or edges in the roadmap that collide with obstacles in the workspace are invalidated. While the location of static obstacles and the layout of the environment may be known in advance, dynamic obstacles and changes to the environment may be detected during online operation, for example using sensors such as 3D sensors (e.g. a 3D or 'stereo' camera). The position and movement of e.g. humans, objects, or other robots may be detected during run-time operations and/or their behaviour can be predicted.

Generally, in order to plan a path for a given task, a planner provided with the roadmap is given start and end states and uses the roadmap to find a suitable collision-free path through the roadmap, e.g. the shortest path, the most efficient path, etc., where the invalidated nodes and edges are not considered.

However, following conventional approaches known in the art per se, the mapping is fixed for a given roadmap, physical robot set-up, and local workspace. If any of the roadmap, the robot and/or the workspace changes, the entire mapping must be changed and remade. This also includes any physical changes made to the robot such as added sensors, different grippers (and gripper states), and picked objects. This is not particularly efficient computationally, and results in significant memory requirements in order to have numerous mappings to cover the various permutations and combinations of parts 'on hand' for if a change is made, or for entire new mappings to be generated to accommodate the changes to the roadmap, robot, and/or workspace.

The Applicant has appreciated that it would be particularly advantageous to provide a more flexible mapping such that the roadmap, the physical extent of the robot and/or objects picked up by the robot, and the workspace (or the workspace resolution) can be changed without the need to recreate the entire mapping.

SUMMARY OF THE INVENTION

When viewed from a first aspect, the present invention provides a method of performing motion planning for a robot, wherein the robot is arranged to operate between a plurality of states in a workspace, said workspace being represented by a plurality of discretized workspace elements, wherein each of said states is connected to at least one other state via at least one respective transition, wherein the method comprises:

generating or receiving a first model;

determining a first set comprising one or more workspace elements that are at least partially in collision with the first model for each of the plurality of states and the respective transition(s) between those states;

generating a first mapping comprising information regarding said first set and the respective plurality of states and respective transition(s) for which the first model is at least partially in collision with the respective workspace elements in the first set, and storing said first mapping in a first memory area;

generating or receiving a second model that extends from the first model;

determining a second set comprising one or more further workspace elements, additional to those in the first set, that are at least partially in collision with the second model for each of the plurality of states and the respective transition(s) between those states; and generating a second mapping comprising information regarding said second set and the respective plurality of states and respective transition(s) for which the second model is at least partially in collision with the respective workspace elements in the second set, and storing said second mapping in a second memory area.

The first aspect of the invention extends to a motion planner arranged to perform motion planning for a robot, wherein the robot is arranged to operate between a plurality of states in a workspace, said workspace being represented by a plurality of discretized workspace elements, wherein each of said states is connected to at least one other state via at least one respective transition, wherein the motion planner is arranged to:

generate or receive a first model;

determine a first set comprising one or more workspace elements that are at least partially in collision with the first model for each of the plurality of states and the respective transition(s) between those states;

generate a first mapping comprising information regarding said first set and the respective plurality of states and respective transition(s) for which the first model is at least partially in collision with the respective workspace elements in the first set, and store said first mapping in a first memory area;

generate or receive a second model that extends from the first model;

determine a second set comprising one or more further workspace elements, additional to those in the first set, that are at least partially in collision with the second model for each of the plurality of states and the respective transition(s) between those states; and generate a second mapping comprising information regarding said second set and the respective plurality of states and respective transition(s) for which the second model is at least partially in collision with the respective workspace elements in the second set, and store said second mapping in a second memory area.

The first aspect of the present invention also extends to a robot comprising the motion planner outlined hereinabove. Thus, the first aspect of the present invention extends to a robot arranged to operate between a plurality of states in a workspace, said workspace being represented by a plurality of discretized workspace elements, wherein each of said states is connected to at least one other state via at least one respective transition, wherein the robot further comprises a motion planner arranged to perform motion planning for said robot, said motion planner being arranged to:

generate or receive a first model;

determine a first set comprising one or more workspace elements that are at least partially in collision with the first model for each of the plurality of states and the respective transition(s) between those states;

generate a first mapping comprising information regarding said first set and the respective plurality of states and respective transition(s) for which the first model is at least partially in collision with the respective workspace elements in the first set, and store said first mapping in a first memory area;

generate or receive a second model that extends from the first model;

determine a second set comprising one or more further workspace elements, additional to those in the first set, that are at least partially in collision with the second model for each of the plurality of states and the respective transition(s) between those states; and generate a second mapping comprising information regarding said second set and the respective plurality of states and respective transition(s) for which the second model is at least partially in collision with the respective workspace elements in the second set, and store said second mapping in a second memory area.

The first aspect of the present invention further extends to a non-transitory computer-readable medium comprising instructions that, when executed by a processor, cause the processor to carry out a method of performing motion planning for a robot, wherein the robot is arranged to operate between a plurality of states in a workspace, said workspace being represented by a plurality of discretized workspace elements, wherein each of said states is connected to at least one other state via at least one respective transition, wherein the method comprises:

generating or receiving a first model;

determining a first set comprising one or more workspace elements that are at least partially in collision with the first model for each of the plurality of states and the respective transition(s) between those states;

generating a first mapping comprising information regarding said first set and the respective plurality of states and respective transition(s) for which the first model is at least partially in collision with the respective workspace elements in the first set, and storing said first mapping in a first memory area;

generating or receiving a second model that extends from the first model;

determining a second set comprising one or more further workspace elements, additional to those in the first set, that are at least partially in collision with the second model for each of the plurality of states and the respective transition(s) between those states; and generating a second mapping comprising information regarding said second set and the respective plurality of states and respective transition(s) for which the second model is at least partially in collision with the respective workspace elements in the second set, and storing said second mapping in a second memory area.

The first aspect of the present invention yet further extends to a computer software product comprising instructions that, when executed by a processor, cause the processor to carry out a method of performing motion planning for a robot, wherein the robot is arranged to operate between a plurality of states in a workspace, said workspace being represented by a plurality of discretized workspace elements, wherein each of said states is connected to at least one other state via at least one respective transition, wherein the method comprises:

generating or receiving a first model;

determining a first set comprising one or more workspace elements that are at least partially in collision with the first model for each of the plurality of states and the respective transition(s) between those states;

generating a first mapping comprising information regarding said first set and the respective plurality of states and respective transition(s) for which the first model is at least partially in collision with the respective workspace elements in the first set, and storing said first mapping in a first memory area;

generating or receiving a second model that extends from the first model;

determining a second set comprising one or more further workspace elements, additional to those in the first set, that are at least partially in collision with the second model for each of the plurality of states and the respective transition(s) between those states; and generating a second mapping comprising information regarding said second set and the respective plurality of states and respective transition(s) for which the second model is at least partially in collision with the respective workspace elements in the second set, and storing said second mapping in a second memory area.

Thus, it will be appreciated that embodiments of the present invention provide an improved approach in which a mapping is generated and stored for the first model (which may be a first link of the robot as outlined below), while the mapping for the second model (which may be a second link of the robot or some other object as outlined below) is built on top of the mapping for the first model. The mappings for the various parts of the robot and/or external objects (e.g. objects to be manipulated by the robot) are 'modular', and can be combined together to provide a mapping of the whole robot suitable for motion planning.

As is outlined in further detail below, the present invention may allow for the set-up of the robot to be changed, without needing to 'swap out' the entire mapping (i.e. without needing to replace a 'whole robot' mapping). In other words, the included components and their arrangement can be changed easily when changes to the robot and/or environment are desired, without recreating the entire mapping or needing to generate and store lots of whole robot mappings which typically increase the memory and computational requirements of the system.

As the second mapping contains workspace element 'hits' (i.e. information relating to workspace elements at least partially in collision with the second model and the corresponding states and/or transitions that resulted in those collisions) that are additional to those in the first mapping, this may—when using a structured roadmap as outlined in further detail below—also allow for significant compression in terms of the memory required to store the mappings related to a given robot set-up, e.g. the number of links the robot has, the type of the link(s), any objects being carried by the robot, etc.

As outlined above, in some embodiments, the states and transitions for the first and second dimensions—and optionally some or all further dimension(s)—may be arranged using a structured roadmap. This may be achieved using the PDRM technique referred to previously. For example, considering a two-link robot, the second link may be posed in all of its states for all of the states of the first link. The use of a structured roadmap may beneficially result in much fewer unique states for the first dimension than for the second etc., which may provide significant memory savings by reusing the mapping for all the states with the same "sub-state" for that link (or other entity). While a structured roadmap is not a requirement of the present invention, the present invention is particularly well-suited to such structured roadmap.

The principles of the present invention also apply to any other approach for building a roadmap known in the art per se, however, such as random or probabilistic sampling techniques.

The physical entity which the first and/or second models can, in some embodiments, be replaced with a different object and/or one or more further objects may be added, where these additional or alternative entities may each have their own respective mapping stored with the corresponding additional elements that are at least partially overlapped by a further model. This further model may comprise a representation of the additional or alternative physical entity.

In some embodiments, the first model comprises a representation of a first link of the robot. The present invention is particularly well suited to multi-link robots, i.e. robots having multiple links such as robot arms with multiple degrees of freedom. Thus, in a potentially overlapping set of embodiments, the second model comprises a representation of a second link of the robot.

Generally, in embodiments in which the robot is a multi-link robot, each link may provide a respective dimension of movement (or 'degree of freedom'). As such, the step of determining the set of workspace elements at least partially overlapped by each model comprises checking the states (i.e. nodes) and transitions (i.e. edges) that are allowed by the respective dimension of movement afforded by said model.

In some potentially overlapping embodiments, the step of determining the set of workspace elements at least partially overlapped by each model comprises checking the states and transitions for collisions with a static obstacle and/or for self-collisions. Thus, states and transitions that would necessarily result in a collision, either with a known static obstacle in the environment and/or the robot itself, may be automatically excluded from consideration. This will also generally affect the considerations for objects further out in the kinematic chain, i.e. later links, end-effectors, and/or external objects.

The robot may, additionally or alternatively, comprise an end effector. As such, the second model (or a further model as outlined in respect of certain embodiments of the present invention) may comprise a representation of an end effector. Those skilled in the art will appreciate that an end effector is a device, typically located at the end of a robot arm, that interacts with the robot's environment or external objects. Thus, in a set of embodiments, the second model comprises a representation of an end effector of the robot. Thus, in one set of embodiments, the robot may be an arm link with an end effector at the distal end of the arm link. However, as is outlined in further detail below, in some embodiments more complex arrangements are provided, for example robot arms having multiple such arm links arranged in series with an end effector at the distal end of the last link. End effectors may also provide one or more dimensions of movement (i.e. degrees of freedom) to the robot.

There are a number of different types of end effector, known in the art per se, which can be used in accordance with the present invention. By way of non-limiting example, the end effector may comprise at least one of: a hand; a gripper; a claw; jaws; a vice; tweezers; pins; needles; magnetic arrangements (including permanent magnets and/or electromagnets); a suction cup; a welding tool; a cutting tool; a rolling tool; a hammer; a laser; a drill; a scalpel; and/or a paint spray gun.

In a particular set of embodiments, more than one model may be utilised for a particular end effector, corresponding to its different operational positions (or 'end effector states'). For example, a gripper may be modelled in an open (i.e. non-gripping) position as one model and in a closed (i.e. gripping) position as another model. Due to the advantageous modular approach provided by embodiments the present invention, the appropriate model can be generated or received for the current or planned state of the end effector when carrying out motion planning. Of course, different mappings may be used for different sections of the path, such as an open gripper when moving toward an object and a closed gripper when picking up the object and moving it to a destination.

The robot may, additionally or alternatively, comprise a sensing arrangement. Such a sensing arrangement may comprise one or more sensors from the group comprising: a camera; a stereo camera; an infrared sensor; a light detection and ranging (LIDAR) sensor; a microphone; an ultrasonic sensor; a proximity sensor; an accelerometer; a gyroscope; a magnetometer; a temperature probe; a pressure sensor; a smoke detector; a gas sensor; a humidity sensor; and a pH probe. As such, the second model (or a further model as outlined in respect of certain embodiments of the present invention) may comprise a representation of a sensing arrangement.

The principles of the present invention extend to 'target' objects that can be interacted with by the robot. These are the sorts of objects that may be picked up, carried, manipulated, touched, moved, pushed, pulled, etc. when the robot is carrying out a task. Thus, in a set of embodiments, at least one model—e.g. the second model or a further model— comprises a representation of an external target object. This may be useful for example on an assembly line where the target objects may comprise parts for assembly into a product (e.g. bolts, screws, metal plates, wiring, motors, glass, electronics, pipes, and so forth). Other non-limiting examples of applications for this include warehousing and in recycling plants.

It will be appreciated that the parts of the robot (e.g. links) can, in general, move in two directions between the states (i.e. nodes), i.e. the transitions (i.e. edges) can be traversed 'forwards' (i.e. from node A to node B) or 'backwards' (i.e. from node B to node A). As the edges are bidirectional and always sweep the same volume, in some embodiments, only workspace element hits (i.e. the workspace elements at least partially in collision with a given model or models) for one direction of the transition are stored. The edges in the direction that are stored are referred to as 'forward edges'. The hits for the edge in the opposite direction, i.e. the 'reverse edges' are stored implicitly. During online execution, to check for validity of a reversed edge, the corresponding forward edge of the neighbour node is checked.

In order to avoid storing redundant information, in some embodiments only the hits of a given transition that are not found in any of the states to which that transition connects are stored. This means that for some transitions or edges, there might not be any hits, if the states or nodes are placed close together. In other words, if a node results in a hit, this can implicitly be stored for all the edges connecting to that node, and space is not wasted storing information regarding the hits for those edges.

The transition(s) may be a combined movement of several joints of the robot (i.e. multi-dimensional edge). However, the Applicant has appreciated that for the 'lowest' link (i.e. innermost) that contributes to the combined movement, the movement is nothing more than a simple movement of that link, which may already be stored for the corresponding simple edge, e.g. if a structured roadmap is used. Thus, in some embodiments, workspace element hits that correspond to combined movements are only stored for the higher links, while the simple transitions for the lower links may be reused. To further increase flexibility, in some embodiments the mappings for each combined transition (i.e. edge) may be stored separately and can be combined for online use as needed.

As referred to hereinabove, the present invention is not limited to the use of two models, and further objects may be included as well. Thus, in some embodiments, the method further comprises:

generating or receiving an additional model that extends from at least one of the other models;

determining an additional set comprising one or more further workspace elements, additional to those in the other sets, that are at least partially in collision with the additional model for each of the plurality of states and the respective transition(s) between those states; and generating an additional mapping comprising information regarding said additional set and the respective plurality of states and respective transition(s) for which the additional model is at least partially in collision with the respective workspace elements in the additional set, and storing said additional mapping in an additional memory area.

There may be multiple such additional models, and each one may extend from any other model (i.e. any of the models corresponding to a link, end effector or other object) in any suitable configuration, i.e. the various parts of the robot and external objects need not extend from one another in series, and other configurations are possible, such that the various links and/or objects—and thus, the corresponding models— may 'branch' off from one another in a tree-like structure, and/or form loops. Each additional model may comprise a representation of a link of the robot, an end effector, or an external target object, as appropriate.

It will be appreciated, therefore, that a library of mappings for different physical entities—i.e. robot components and/or external target objects—can be generated and used for motion planning. A mapping can be created and stored for each link, end effector, and/or target object that may extend from the robot, and these mappings may be selected from the library in order to easily plan a path for a given task for a particular arrangement of the robot. This modular approach is highly beneficial because it avoids the need to create entire mappings for every combination and permutation of robot components (e.g. links and end effectors) and/or external objects, thereby potentially providing substantial memory savings. The use of such a library of mappings is also useful in arrangements where mappings take a significant amount of time to generate. By generating the mappings in advance and storing them for later use, a desired selection of the mappings can be retrieved from the memory when required.

An arrangement in which mappings may be selected from a library and combined in a modular way is novel and inventive in its own right. Thus, when viewed from a second aspect, the present invention provides a method of performing motion planning for a robot, wherein the robot is arranged to operate between a plurality of states in a workspace, said workspace being represented by a plurality of discretized workspace elements, wherein each of said states is connected to at least one other state via at least one respective transition, wherein the method comprises:

selecting a first mapping from a library of mappings, said first mapping comprising information regarding a first set comprising one or more workspace elements that are at least partially in collision with a first model, said first mapping further comprising information regarding the respective plurality of states and respective transition(s) for which the first model is at least partially in collision with the respective workspace elements in the first set; and selecting a second mapping from the library of mappings, said second mapping comprising information regarding a second set comprising one or more workspace elements, additional to those in the first set, that are at least partially in collision with a second model that extends from the first model, said second mapping further comprising information regarding the respective plurality of states and respective transition(s) for which the second model is at least partially in collision with the respective workspace elements in the second set.

The second aspect of the invention extends to a motion planner arranged to perform motion planning for a robot, wherein the robot is arranged to operate between a plurality of states in a workspace, said workspace being represented by a plurality of discretized workspace elements, wherein each of said states is connected to at least one other state via at least one respective transition, wherein the motion planner is arranged to:

select a first mapping from a library of mappings, said first mapping comprising information regarding a first set comprising one or more workspace elements that are at least partially in collision with a first model, said first mapping further comprising information regarding the respective plurality of states and respective transition(s) for which the first model is at least partially in collision with the respective workspace elements in the first set; and select a second mapping from the library of mappings, said second mapping comprising information regarding a second set comprising one or more workspace elements, additional to those in the first set, that are at least partially in collision with a second model that extends from the first model, said second mapping further comprising information regarding the respective plurality of states and respective transition(s) for which the second model is at least partially in collision with the respective workspace elements in the second set.

The second aspect of the present invention also extends to a robot comprising the motion planner outlined hereinabove. Thus, the second aspect of the present invention extends to a robot arranged to operate between a plurality of states in a workspace, said workspace being represented by a plurality of discretized workspace elements, wherein each of said states is connected to at least one other state via at least one respective transition, wherein the robot further comprises a motion planner arranged to perform motion planning for said robot, said motion planner being arranged to:

select a first mapping from a library of mappings, said first mapping comprising information regarding a first set comprising one or more workspace elements that are at least partially in collision with a first model, said first mapping further comprising information regarding the respective plurality of states and respective transition(s) for which the first model is at least partially in collision with the respective workspace elements in the first set; and select a second mapping from the library of mappings, said second mapping comprising information regarding a second set comprising one or more workspace elements, additional to those in the first set, that are at least partially in collision with a second model that extends from the first model, said second mapping further comprising information regarding the respective plurality of states and respective transition(s) for which the second model is at least partially in collision with the respective workspace elements in the second set.

The second aspect of the present invention further extends to a non-transitory computer-readable medium comprising instructions that, when executed by a processor, cause the processor to carry out a method of performing motion planning for a robot, wherein the robot is arranged to operate between a plurality of states in a workspace, said workspace being represented by a plurality of discretized workspace elements, wherein each of said states is connected to at least one other state via at least one respective transition, wherein the method comprises:

selecting a first mapping from a library of mappings, said first mapping comprising information regarding a first set comprising one or more workspace elements that are at least partially in collision with a first model, said first mapping further comprising information regarding the respective plurality of states and respective transition(s) for which the first model is at least partially in collision with the respective workspace elements in the first set; and selecting a second mapping from the library of mappings, said second mapping comprising information regarding a second set comprising one or more workspace elements, additional to those in the first set, that are at least partially in collision with a second model that extends from the first model, said second mapping further comprising information regarding the respective plurality of states and respective transition(s) for which the second model is at least partially in collision with the respective workspace elements in the second set.

The second aspect of the present invention yet further extends to a computer software product comprising instructions that, when executed by a processor, cause the processor to carry out a method of performing motion planning for a robot, wherein the robot is arranged to operate between a plurality of states in a workspace, said workspace being represented by a plurality of discretized workspace elements, wherein each of said states is connected to at least one other state via at least one respective transition, wherein the method comprises:

selecting a first mapping from a library of mappings, said first mapping comprising information regarding a first set comprising one or more workspace elements that are at least partially in collision with a first model, said first mapping further comprising information regarding the respective plurality of states and respective transition(s) for which the first model is at least partially in collision with the respective workspace elements in the first set; and selecting a second mapping from the library of mappings, said second mapping comprising information regarding a second set comprising one or more workspace elements, additional to those in the first set, that are at least partially in collision with a second model that extends from the first model, said second mapping further comprising information regarding the respective plurality of states and respective transition(s) for which the second model is at least partially in collision with the respective workspace elements in the second set.

The first and second models may each be a representation of a link of the robot, an end effector, or an external target object as outlined previously.

This modular 'library' approach to the mappings allows for further mappings to then be added on top. Thus, in some embodiments, the method further comprises selecting a further mapping from the library of mappings, said further mapping comprising information regarding a further set comprising one or more workspace elements, additional to those in the first set and the second set, that are at least partially in collision with a further model that extends from the first model and/or the second model, said further mapping further comprising information regarding the respective plurality of states and respective transition(s) for which the further model is at least partially in collision with the respective workspace elements in the further set.

The method also provides for replacement of one mapping with another. Thus, in some embodiments, the second mapping may be replaced with a third mapping comprising information regarding a third set comprising one or more workspace elements, additional to those in the first set, that are at least partially in collision with a third model that extends from the first model, said third mapping further comprising information regarding the respective plurality of states and respective transition(s) for which the third model is at least partially in collision with the respective workspace elements in the third set. Thus, by way of non-limiting example, if the current set-up corresponds to a robot arm with a gripper as an end effector, the first and second models may correspond to an arm link and the gripper. However, if the gripper is to be replaced with a cutting tool, the second model may be replaced with a third model, which corresponds to the cutting tool.

Of course, it will be appreciated that any number of additions and substitutions may be made to select mappings that correspond to the actual robot set-up of interest.

The various models referred to hereinabove in respect of the aforementioned aspects of the invention need not necessarily relate to different physical entities. In some embodiments, at least two of the models are each a representation of the same physical entity. In such arrangements, one model may be an extension of the other to cover different extents that the entity might have. This can be seen as providing modular models of a particular physical entity at the entity level, similar to how the models can be used in a modular way at the robot level outlined previously. In other words, the multiple models for a given physical entity act as layers of an onion, where the 'outer' models can partially or wholly wrap around other 'inner' models, or extend from them. This may be particularly beneficial for generating mappings of a number of different external target objects, i.e. objects that are to be manipulated by the robot. For example, if the robot is arranged to manipulate lengths of pipe, a first model may represent a pipe having a certain diameter and length, while a second model may represent a pipe having a different diameter and/or length, where the mapping for the second, larger pipe is 'built on' the mapping for the first, smaller pipe.

This 'onion' approach may be useful for parts of the robot too, for example end effectors. By way of non-limiting example, consider a pincer-like gripper having two fingers, where a first finger is static and the second finger can be moved towards and away from the first finger to grip something. Rather than modelling this gripper as a single model (or a pair of models, one for each of the open and closed positions), the 'onion-like' approach outlined above may be used such that the 'static' parts of the gripper (i.e. the first finger and the rest of the 'hand' or 'palm' from which the fingers extend) is represented by one model, and the dynamic part (i.e. the second finger) is represented by further model(s) for various positions (e.g. fully open, fully closed, and/or one or more intermediate positions). Of course, this extends to parts having multiple moving elements (e.g. if both fingers moved in the previous gripper example).

Mappings can then be generated that efficiently store information regarding which workspace elements are hit (i.e. at least partially in collision with) on account of the first finger, and which additional elements are then hit on account of the second finger depending on its position. This allows the model being used for the second finger to be swapped out easily when the configuration of the gripper changes (or is planned to change), without needing to replace the model for the entire gripper or, in the case of conventional approaches, the model for the entire robot including the gripper.

The 'memory areas' used for storing the mappings may be any suitable arrangement for storing data. In some embodiments, the first and second memory areas are each within a memory, wherein they may be within the same memory. Any additional memory areas may also be within that same memory or a different memory as appropriate. A memory may be at least one of: a read-only memory (ROM); a random access memory (RAM); a solid state device (SSD); a hard disk drive (HDD); FLASH storage; a dedicated video RAM (VRAM); or other suitable memory device.

Preferably, the memory is local, i.e. it is located within the same device, system, or apparatus being used to carry out the motion planning. Embodiments of the present invention are particularly beneficial where the motion planning process is at least partially carried out on a parallel processing unit (e.g. a GPU), as one or more of the mappings may, at least in some embodiments, be stored locally in the memory of the parallel processing unit. This may allow the mappings to be 'switched out' quickly when needed, without relying on any connection (e.g. over a network) to an external entity. The parallel processing unit (e.g. GPU) may be used alongside a central processing unit (CPU) in some arrangements, where calculations using the mapping(s) may be sent to the parallel processing unit.

However, in a potentially overlapping set of embodiments, one or more mappings may be stored in a remote memory or an off-chip memory. It will be understood that the term 'remote' or 'off-chip' in this context means external to the device, or specific part of the device (such as a specific processor), carrying out the motion planning (e.g. motion planner). For example, if the motion planning is being carried out by a particular processor, the mappings may be stored externally of that processor and any associated on-chip memory. In such an arrangement, mappings may be stored externally (e.g. on off-chip storage, an external server, on another device, or in the cloud) and streamed to the device carrying out the motion planning. It will be appreciated that in a 'remote' memory arrangement, data (e.g. a roadmap and/or mapping(s)) is generally sent from an off-chip memory (or some other external storage device) to the motion planner. The data may then be discarded after use (either immediately once the memory is no longer required for this task, after some predetermined time, or once the memory is required for another task). The modular mappings may be advantageous for example when in an arrangement in which smaller mappings can be transferred from an off-chip memory to the processor(s) for only those parts for which the mapping is required, rather than for the full robot. This may, by way of example only, allow for the use of less bandwidth or a less reliable network connection. Further advantageously, this may be useful where mappings may take a significant amount of time to generate, and so being able to download the specific mappings needed from an external memory when required may be particularly beneficial.

A hybrid of these local memory and streaming approaches may be used, such that some mappings are stored locally (e.g. those used frequently, or that are closely related to those currently in use), while others may be stored remotely and streamed in when required.

As outlined previously, the later set(s) (e.g. the second set) include one or more workspace elements that are additional to those in the earlier set(s) (e.g. the first set). Thus, workspace elements that are hit due to the inclusion of the corresponding model associated with the later set(s) are used for generating the appropriate mapping, while not requiring workspace elements 'hit' by the 'earlier' models to be stored. These 'additional' workspace elements may, in some embodiments, be determined directly, for example by using a detection process that only looks for 'new' hits of workspace elements by the new model being considered. However, in some other embodiments, the method comprises removing one or more workspace elements from the second set that are in first set. In other words, the determination of the second set may involve initially determining workspace elements hit by the other earlier model(s) too, but then removing one or more (and in some cases all) those workspace elements already in an earlier set to avoid redundantly storing these.

While workspace elements that are at least partially in collision with a given model may be added to the appropriate set and thus included in the resultant mapping, this does not necessarily mean that all such workspace elements at least partially overlapped by that model are added to the set and mapping.

It will be appreciated that where the links and/or objects physically touch one another, e.g. at joints or interfaces, there will be some workspace elements that are at least partially in collision with more than one of the models. In some embodiments, these workspace elements are included in the sets corresponding to each model. In some potentially overlapping embodiments, however, some or all of these 'shared' workspace elements may be contained only in one of the sets. A suitable convention may be chosen, for example the workspace elements may be included in the earliest set, i.e. the set corresponding to the link or object closest to the robot's base. By including such workspace elements having shared occupation in only one of the sets, the total amount of memory required can be further reduced, which may enhance the benefits outlined above. However, there may be certain arrangements that benefit from the occupation information relating to joints and/or interfaces being redundantly stored in each of the relevant sets.

Additionally, or alternatively, there may be one or more workspace elements at least partially in collision with a particular object (e.g. a link) that also at least partially overlap with a static part of the robot, for example a robot base from which one or more of the link(s) and/or object(s)—and thus the corresponding model(s)—extend. These 'static' workspace elements may be included in the most 'inner' set (i.e. that of the first set), or may be stored in a separate 'base' mapping that contains information relating to the workspace elements that are at least partially occupied at all times because they are hit by the robot's static base. Thus, in some embodiments, the method comprises generating a base mapping comprising information regarding one or more workspace elements that are at least partially in collision with a static part of the robot.

As outlined above, the mappings store information relating to the workspace elements that are at least partially occupied. This may, in some embodiments, mean that the entire set is stored as the mapping. However, the Applicant has appreciated that there may be more memory-efficient ways of storing the information regarding the relevant workspace elements. In some embodiments, the information stored for one or more of the mappings may comprise a plurality of points of interest, for example corners and/or center points. It will be appreciated by those skilled in the art that the partially occupied workspace elements may form one or more arrays, areas, surfaces, and/or volumes, which can be reconstructed from a select number of 'points of interest' such as 'corner points' and/or 'center points'. Consider, for example, a model that relates to a cube-shaped object. The workspace elements at least partially in collision with that object may also form a cube. While the set comprising all of these elements could be stored, two opposite corners (e.g. the bottom-left-back corner and the top-right-front corner) is sufficient to be able to reconstruct the entire cube. Similarly, knowledge of the center point may be used to reconstruct an object, e.g. if combined with knowledge of how far the object extends from that center point, where this extent (or multiple such extents in different directions) may be stored alongside the center point as appropriate.

The workspace elements themselves need not all be of the same shape and/or size, and do not necessarily have to be 'square/rectangular' pixels or 'cube/cuboid' voxels. In some embodiments, the workspace is discretized into workspace elements of different shapes and/or sizes. This may allow for a higher resolution (i.e. smaller workspace elements and thus higher workspace element density) in areas of significant interest while allowing lower resolution (i.e. larger workspace elements and thus lower workspace element density) in areas of less interest. In a particular example in which a robot is to work in an environment alongside a human operator, a higher resolution may be used in areas in which the human will generally occupy and in which the robot will be carrying out most tasks, while a lower resolution may be used behind the robot or at the extreme periphery of the area where neither the human nor the robot is likely to be spending much time. Similarly, different shapes of workspace element may be used in different areas—for example elements may have a curved cross section in one area and a quadrilateral cross section in another area, depending on what the most appropriate shape for a particular part of the environment.

Flexibility in the workspace size and resolution is highly beneficial because creating a map from scratch is much more costly computationally than recreating one from a high-resolution map. This way, only one pre-generated high-resolution map need be stored rather than a number of maps for a range of resolutions and sizes, and this single high-resolution map can then be reused as needed for different applications based on need as well as the computation resources available.

In some embodiments of either of the foregoing aspects, the mappings may then be used to generate a path for the robot to follow. In other words, the combination of the appropriate mappings can be used in the same way that a single mapping for an entire robot normally is, in order to generate an appropriate plan for the robot to execute a given task.

The physical entities, represented by the various models referred to hereinabove, may be able to move laterally within the robot's environment. However, one or more of these entities may additionally or alternatively be able to rotate around one or more axes. For example, an end effector such as a gripper may be able to rotate about its major axis, akin to a human hand twisting at the wrist. Each rotation may form another 'state' (e.g. configuration) of the robot in the same way that a different lateral position of the robot does. Generally, the rotational states may be discretized in some way, where mappings can be generated for these discretized states. The Applicant has appreciated, however, that the entity, or a part of the entity, may have a degree of axial symmetry greater than one. For example, a rotating tool such as a propellor having two symmetric propellor blades located at the end of a shaft, where the shaft (and thus the propellor) rotates around its major (i.e. longitudinal) axis. The workspace elements hit by the shaft may be the same in all rotational states of the propellor. Similarly, the workspace elements hit by the propellor blades in a given rotational may be the same state as the state 180° (i.e. a half rotation) away.

In such cases, the workspace elements at least partially occupied as that entity rotates may be identical in multiple rotational positions. Thus, in some embodiments, the workspace elements partially occupied identically for multiple states for a rotationally symmetric model may be stored only once, and the other states may then simply refer to the first rotationally identical state which resulted in those workspace elements being added to the set for the mapping.

In some arrangements, more than one robot may be used together or in close proximity of one another. The principles of the foregoing aspects apply equally to motion planning for a second robot (or any number of further robots, as appropriate).

A mapping may comprise state identifiers and transition identifiers for each workspace element in the mapping. In other words, using graph terminology, embodiments of the present invention may store node and edge identifiers (or 'IDs') for each workspace element or voxel. Thus, each workspace element (e.g. voxel) may have a list of all nodes and edges that represents a partial or complete collision with that element, i.e. a list of 'hits'. By storing state and transition IDs for each workspace element, improvements can be made in terms of the optimization of memory and computation. Of course, in such arrangements, some workspace elements (or voxels) may have an empty list (due to that element not being hit by any node or edge).

In other embodiments, however, a workspace element (e.g. voxel) ID is stored for each edge, and/or for each node.

It will be appreciated that the optional features described hereinabove in relation to any particular aspect of the invention apply equally to the other aspects of the invention, as appropriate.

Similarly, any and all optional features described in relation to embodiments of the method, motion planner, robot, non-transitory computer-readable medium, and computer software product associated with a particular aspect of the invention apply equally, mutatis mutandis, to the others of said method, motion planner, robot, non-transitory computer-readable medium, and computer software product associated with that aspect.

Where an optional feature is described in relation to a method step, this extends to a device, an apparatus or a system (e.g. a motion planner or a robot as outlined hereinabove) that is arranged to carry out that same method step. Similarly, where an optional feature is described in relation to an aspect of a device, an apparatus or a system, this extends to a corresponding method step, or a method step acting on such a device, an apparatus or a system.

BRIEF DESCRIPTION OF DRAWINGS

Certain embodiments of the invention will now be described, by way of example only, with reference to the accompanying drawings in which:

FIG. 7 is a schematic diagram illustrating the uniquely mapped workspace elements hit by fingers of the gripper in the open position as shown in FIG. 6;

DETAILED DESCRIPTION

Figure 1:
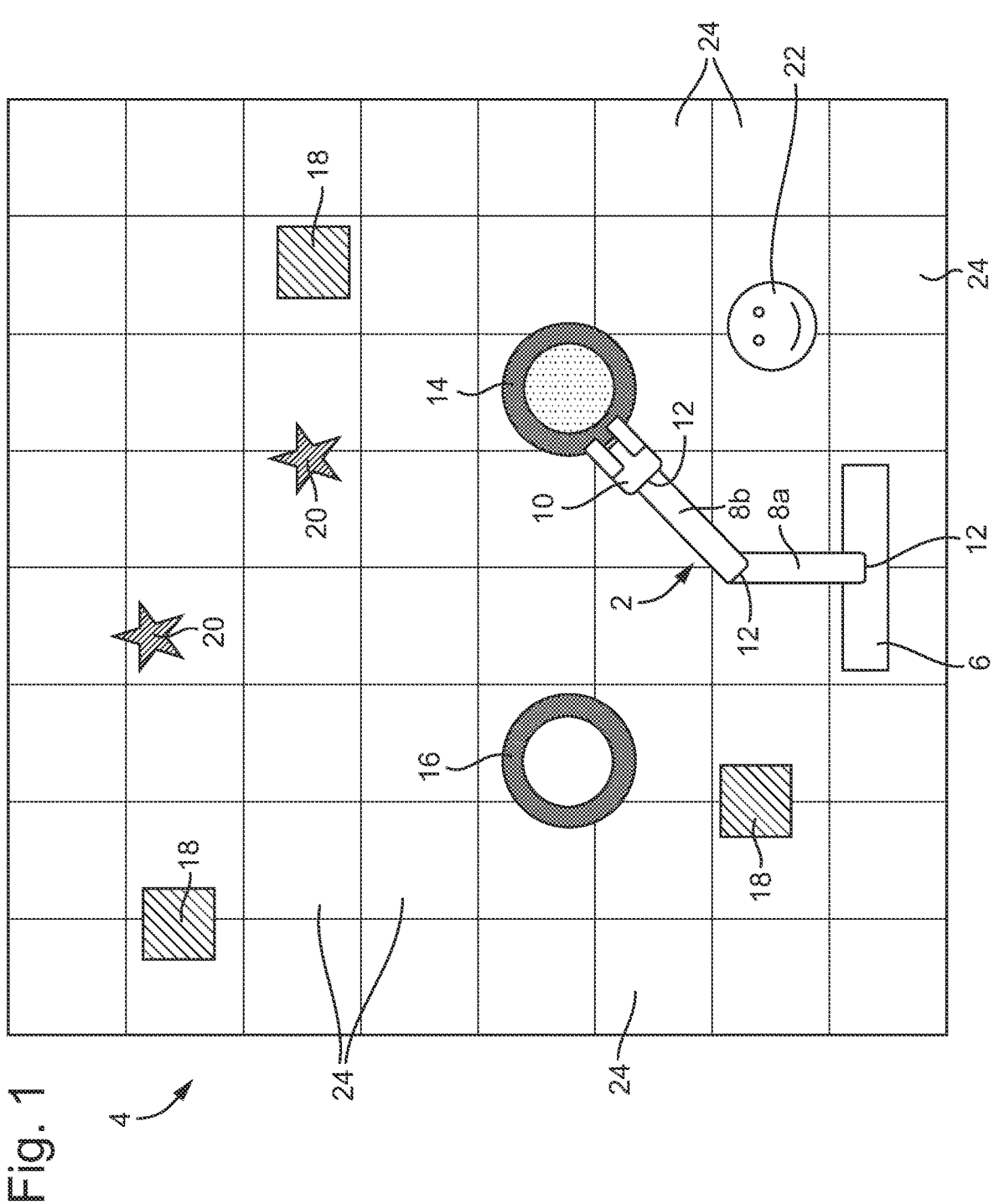
FIG. 1 is a schematic diagram of a typical arrangement in which motion planning is required for a robot in an environment.

FIG. 1 is a schematic diagram of a typical arrangement in which motion planning is required for a robot arm 2 operating in an environment 4. The robot arm 2 consists of a base 6, a pair of links 8a, 8b, and an end effector 10 connected to each other at joints 12. The robot arm 2 is tasked with moving items from one bin 14 to a second bin 16, e.g. for sorting parts on an assembly line. However, the robot arm 2 must avoid a number of static obstacles 18, dynamic obstacles 20, and human beings 22.

The workspace 4 is discretized (i.e. 'broken up') into a number of different workspace elements 24, where only a small selection of these are labelled on FIG. 1 for ease of illustration. Each of these workspace elements 24 is a voxel, such that the workspace 4 is split up into a three-dimensional grid of cubes. It will be appreciated, however, that while the workspace elements 24 in FIG. 1 are all of the same size and shape, this need not be the case and in other examples, different resolutions and/or shapes may be used in some areas of the workspace 4 compared to others. Similarly, if dealing with a two-dimensional problem, the workspace could be split into a grid of two-dimensional workspace elements (e.g. pixels or squares) as appropriate.

The workspace 4 may be updated as changes to the environment are detected or captured. For example, a sensor such as a 3D camera may be used to detect changes to the environment and dynamic obstacles. The discretized workspace 4 can be then updated accordingly. The workspace 4 may additional or alternatively be updated in response to predicted movement of an entity in the space (e.g. a dynamic obstacle or a human moving within the environment). Updates to the workspace 4 may, by way of example only, be carried out for example in relation to physical placement of an object, the distance to the object, the type of object, or the predicted movement of the object.

As is well known in the art, when performing motion planning, the range of motion available to a robot can be described using a roadmap, where the nodes of the roadmaps are the possible states of the robot, and the edges connecting the nodes are the transitions between those states. While the roadmap is used for motion planning, the robot may, of course, move outside of the roadmap.

In the specific but non-limiting examples described below, the 'states' relate to the configurations of the robot 2. However, it will be appreciated that, as outlined above, further parameters may (additionally or alternatively) form part of the states, such as velocity, angle, time, temperature, etc. In other words, the robot positioned identically (at a particular instant in time) but with a first velocity may be represented by a different state to when the robot has a second, different velocity.

In order to carry out motion planning for the robot 2, a roadmap is generated that describes the operation space of the robot 2, where one dimension is provided for each joint 12. However, instead of creating a single map for the entire roadmap and the entire robot 2 as is done in prior art approaches, embodiments of the present invention separate the links (and end effectors, and any other related target objects) as outlined below.

The first step of generating the mappings in accordance with embodiments of the present invention is to separate the mappings for each link 8a, 8b; end effector 10; and target object (e.g. the items being moved from one bin 14 to the other bin 16).

Figure 2A:
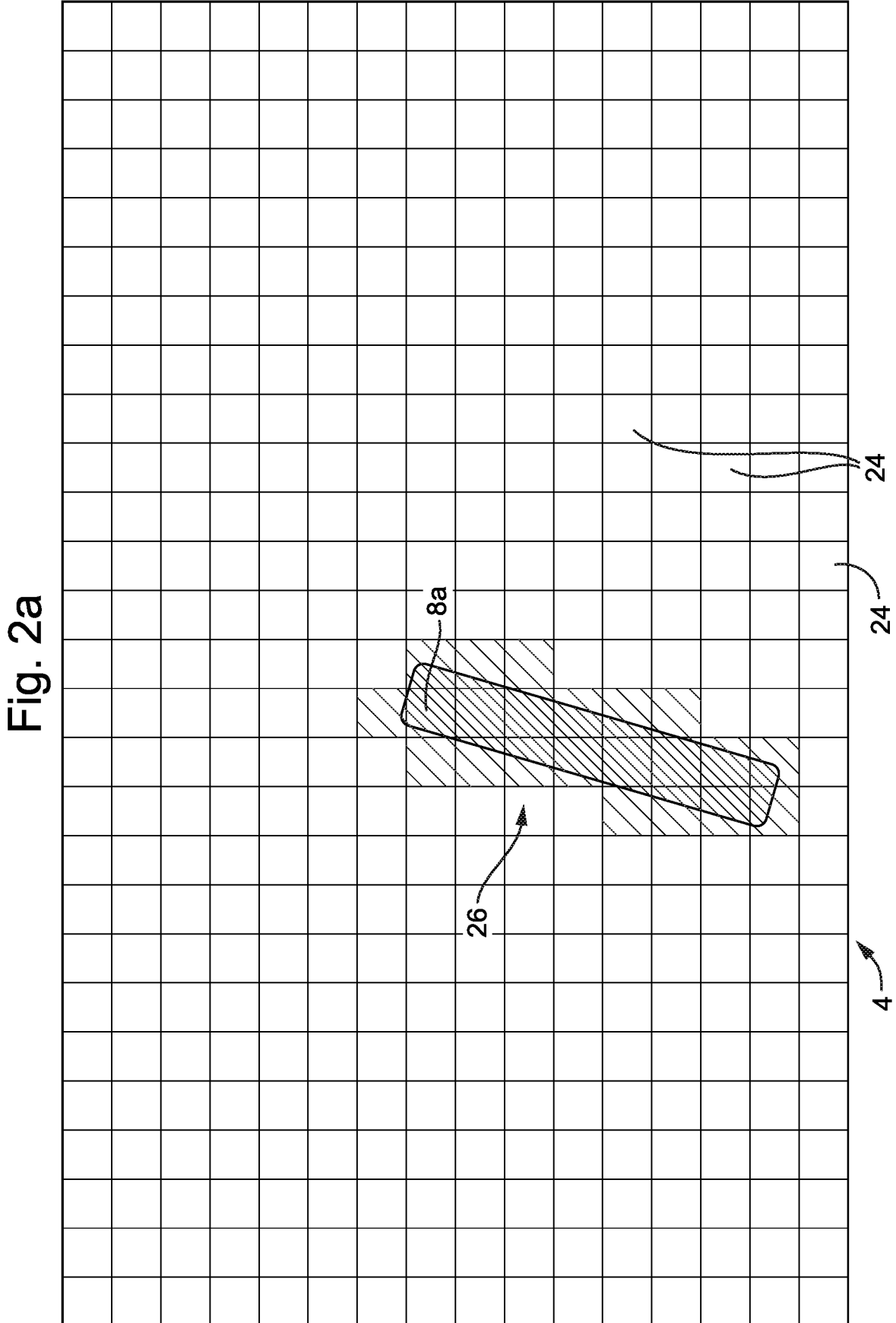
FIGS. 2a and 2b are schematic diagrams illustrating the workspace elements hit by a first robot link.

First, a mapping for the first link 8a is created, where the robot 2 is considered as a 1-DOF (one degree-of-freedom) robot, as shown in FIG. 2a. This is performed by posing a model of the first link 8a in all configurations (i.e. in all possible states) and checking all edges (i.e. transitions) allowed by the first dimension in the roadmap, i.e. the degree-of-freedom provided by the first link 8a.

Those workspace elements that are partially or wholly occupied 26 by the first link 8a in the various states and transitions are added to a set of elements that is then used to generate a mapping for the first link 8a. This mapping effectively provides information regarding the set of workspace elements 26 (out of all of the workspace elements 24) that are at least partially in collision with the first link 8a in each of the different states and transitions.

Figure 2B:
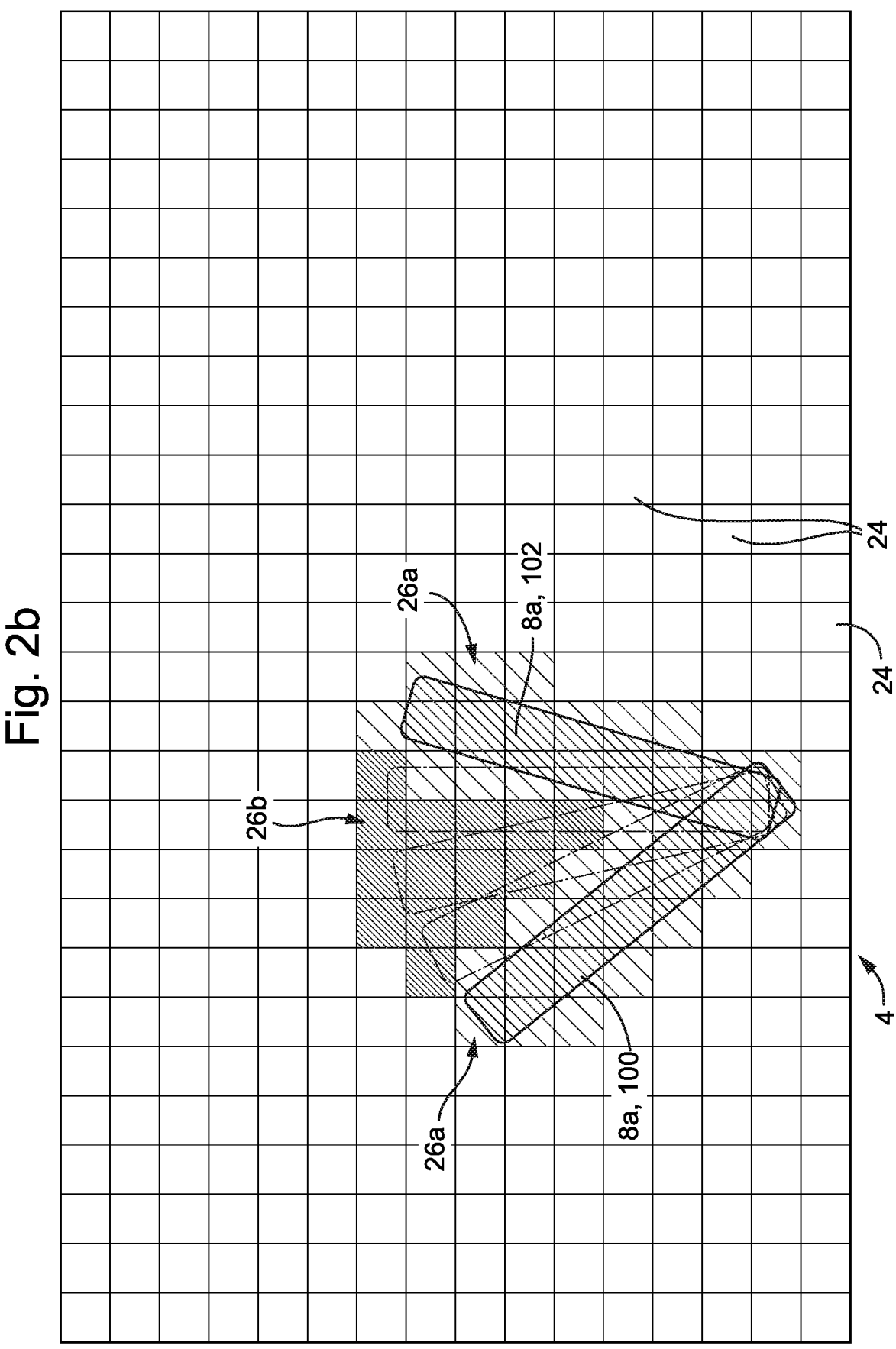

While FIG. 2a shows these elements 26 for a single configuration, the set of elements 26 hit by different states and transitions can be seen in FIG. 2b, which shows a transition between a first state 100 and a second state 102. Here, the elements 26 in the set are split into those elements 26a hit by the model of the first link 8a in the two states (nodes) 100, 102, and those elements 26b hit during the transition (edge) between those states.

The mapping for the first link 8a is stored in memory as a separate 'Link 1 Map'. This mapping will be very small compared to a mapping for the entire robot 2, as per prior art approaches.

Figure 3:
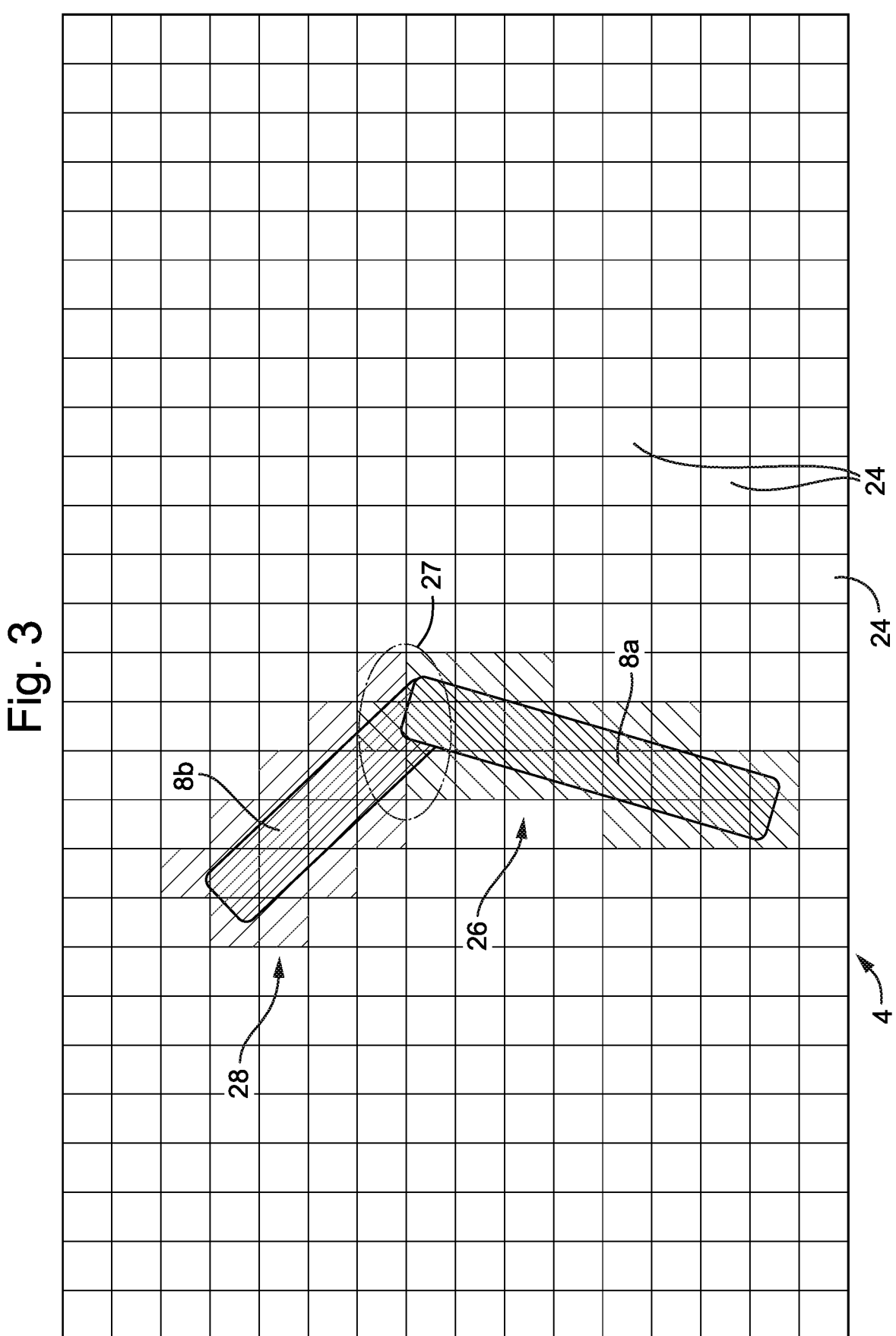
FIG. 3 is a schematic diagram illustrating the additional workspace elements hit by a second robot link.

Next, a model of the second link 8b is added as shown in FIG. 3, and now the first two dimensions are considered. The new 2-DOF robot is posed in all configurations and checked for all edges in the roadmap. As can be seen in FIG. 3, there are some workspace elements 27 that are hit around the joint between the first link 8a and second link 8b. These elements 27 are already stored in the mapping for the first link 8a and thus could be ignored when generating the second mapping for the second link 8b. Thus, only the workspace elements 28 that are uniquely hit by the second link 8b are used to generate the second mapping, i.e. the 'Link 2 Map', which is stored in the memory, separate to the Link 1 Map.

Thus, all workspace element hits arising from both the first link 8a and the second link 8b are compressed away, and only stored in the mapping for the 'lower' link, i.e. the first link 8a. The hits can efficiently be checked for uniqueness by looking up in the already produced mapping for the lower link, without the need to perform collision checking for that link.

However, in some arrangements, information relating to these elements 27 may be used to generate the second mapping too, such that the 'overlapping' elements 27 are included in both mappings.

Figure 4:
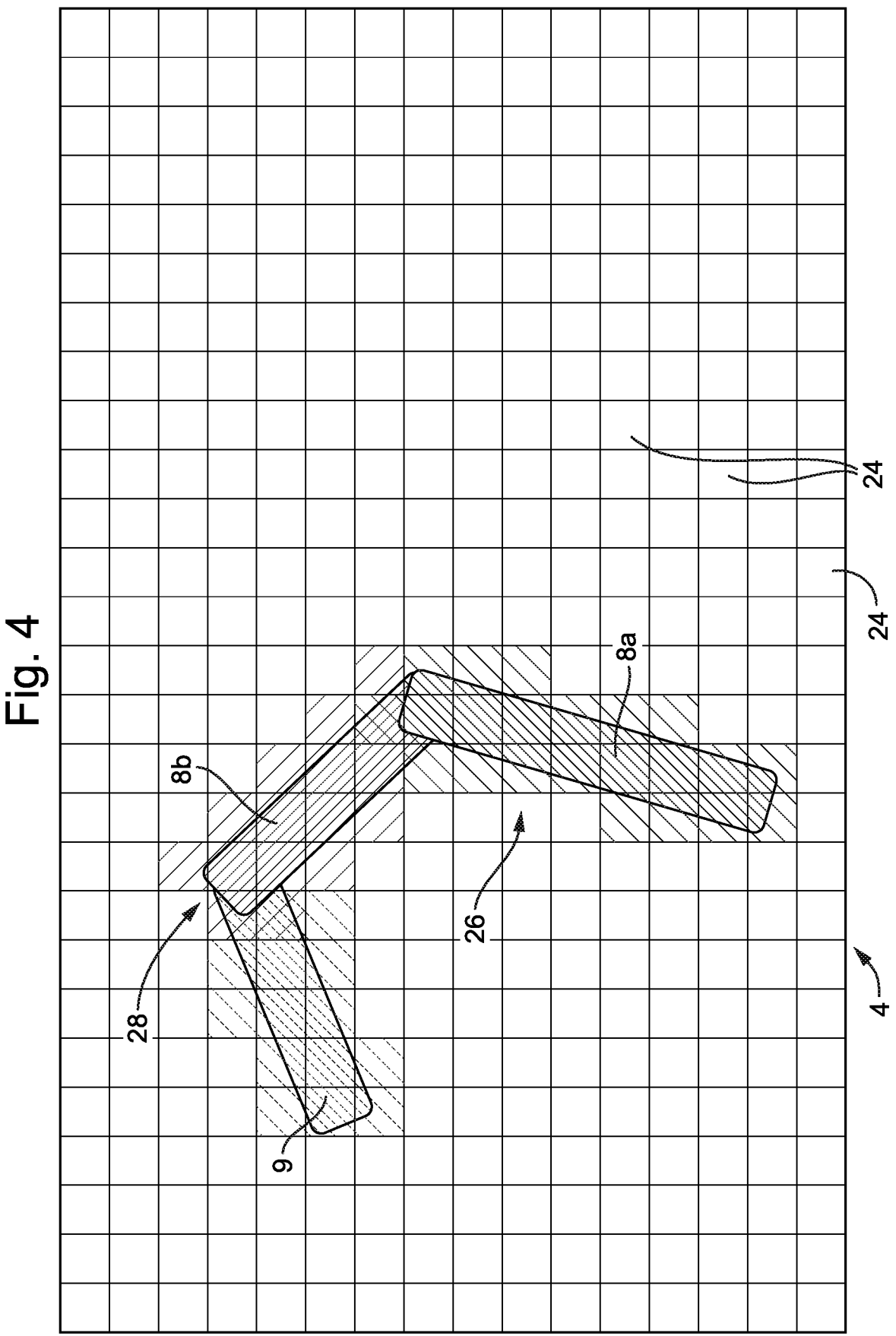
FIG. 4 is a schematic diagram illustrating the further additional workspace elements hit by a further robot link.

The routine is continued by further object(s) 9 and accounting for the corresponding degree(s) of freedom as shown in FIG. 4, where a mapping is generated for each additional link, until the entire robot 2 is mapped for all degrees of freedom. While another link is shown as the object 9 in FIG. 4, the process may be carried out for any end effectors and target objects, as outlined in further detail below.

The process may also be carried out for alternative and/or additional objects (e.g. links, end effectors, or target objects), not currently on the robot 2. For example, if there are a number of different tools that can be attached to the second link 8b as end effectors, a mapping may be generated for each end effector and stored in memory. In some cases, a given object may have more than one stored mapping, relating to different operational states of that object. For example, a gripper that can be open or closed, might have separate mappings stored in the memory for each of the open and closed conditions. Thus, new equipment, e.g. sensors and grippers, can be added in the same manner. The link the equipment is connected to dictates the dimensions that need to be considered for the mapping. All unique hits that come from the considered equipment are mapped in a separate 'Part X Map'.

A particular object may also be represented by more than one mapping. For example, a gripper may be split into one mapping for a 'palm' part, and another pair of mappings for a 'moveable finger' part that moves toward and away from the palm, where one mapping is stored for the finger in the open position, and another mapping is stored for the finger in the closed position.

Figure 5:
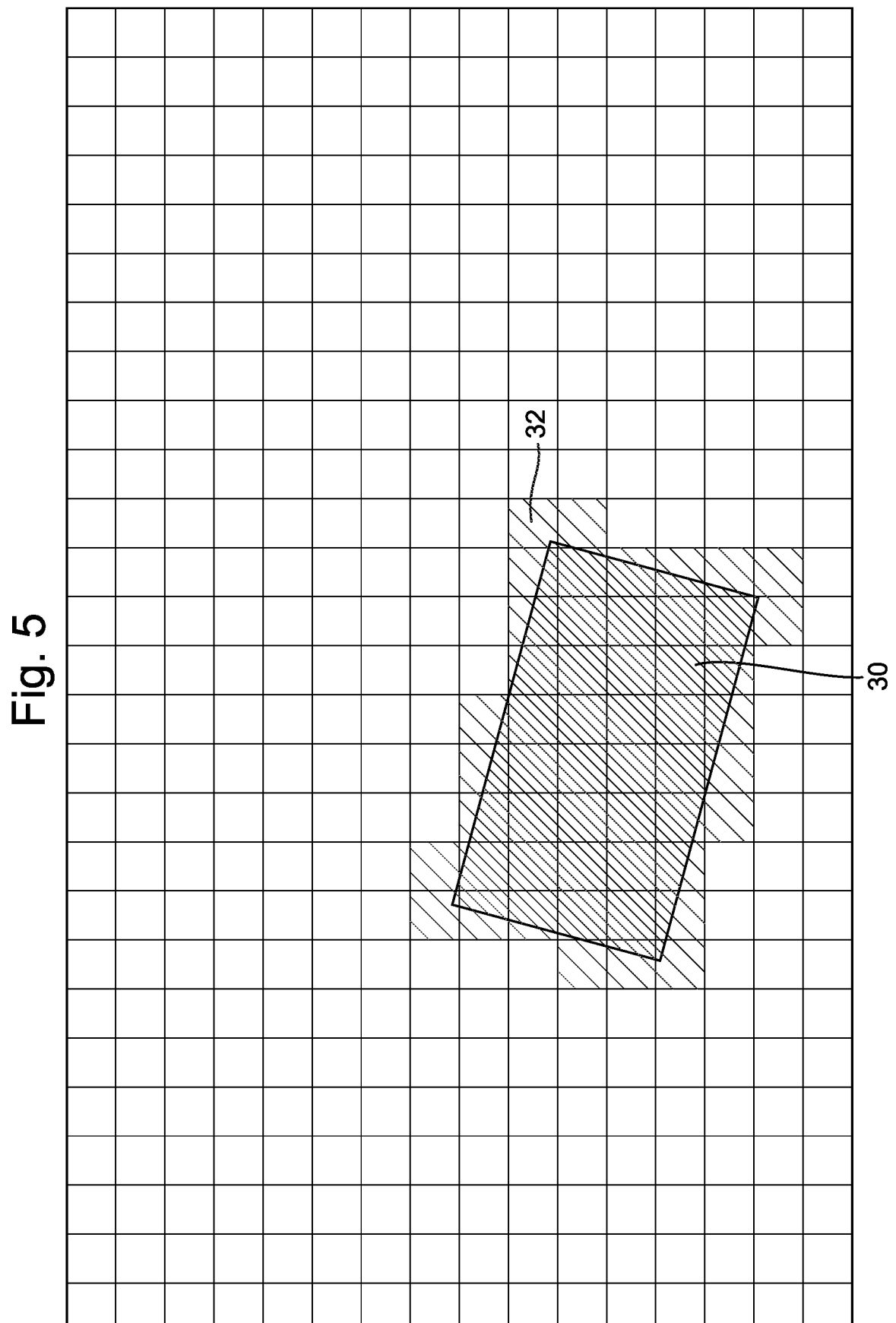
FIG. 5 is a schematic diagram illustrating the workspace elements hit by a gripper palm.

An example of this is shown in FIGS. 5 to 9. FIG. 5 is a schematic diagram of a gripper palm 30, where this palm 30 forms part of a gripper end effector that can be positioned at the distal end of the robot 2. Specifically, FIG. 5 illustrating the workspace elements 32 that are hit by the gripper palm 30 in a particular state.

The gripper also has two fingers 34 that can be operated between an open position, in which the fingers 34 are separated from one another by a gap, and a closed position in which the fingers 34 are brought closer together—laterally moving with respect to the palm 30—thereby reducing the gap between them so as to grip an object.

Figure 6:
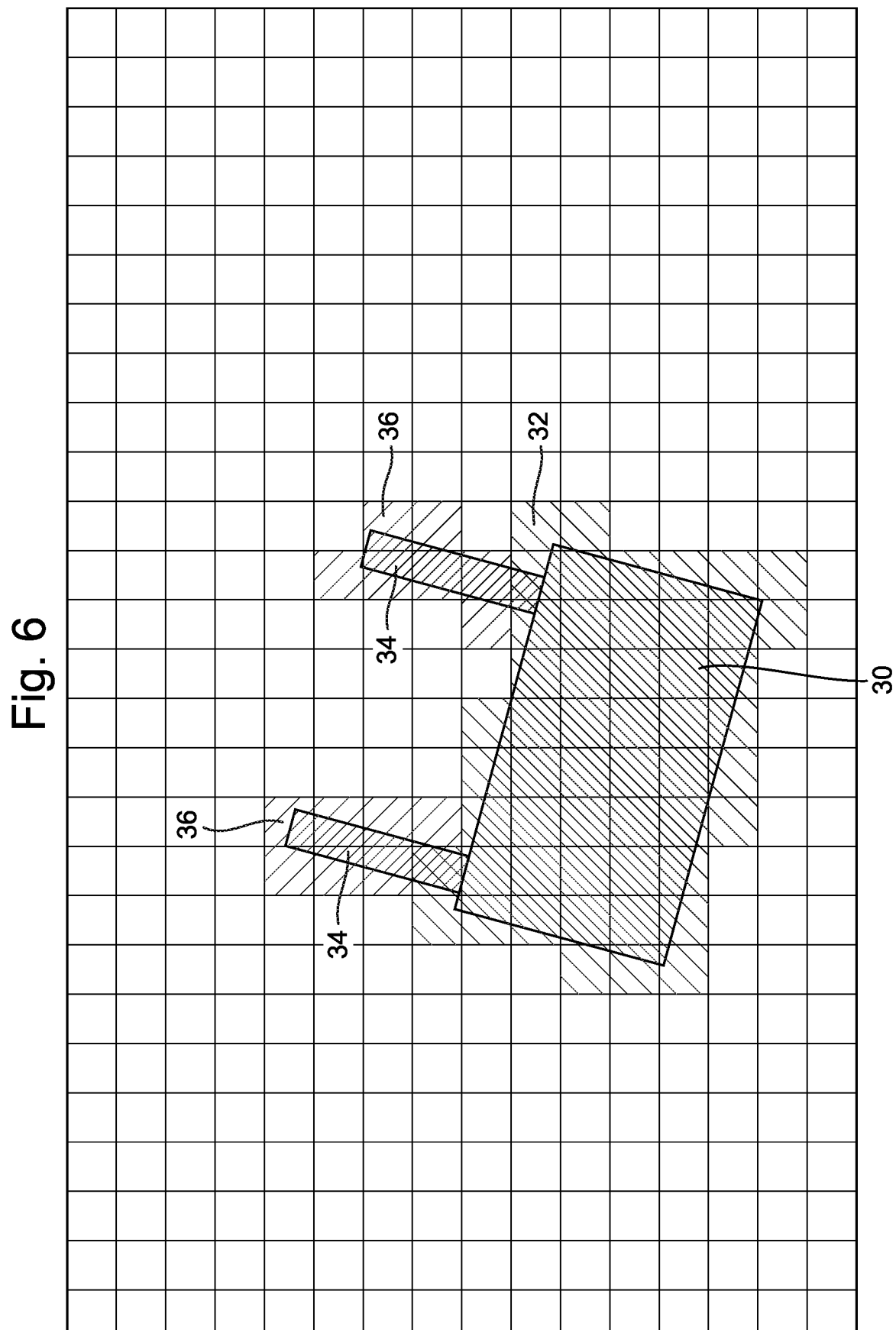
FIG. 6 is a schematic diagram illustrating the workspace elements hit by fingers of the gripper of FIG. 5 in an open position.
Figure 7:
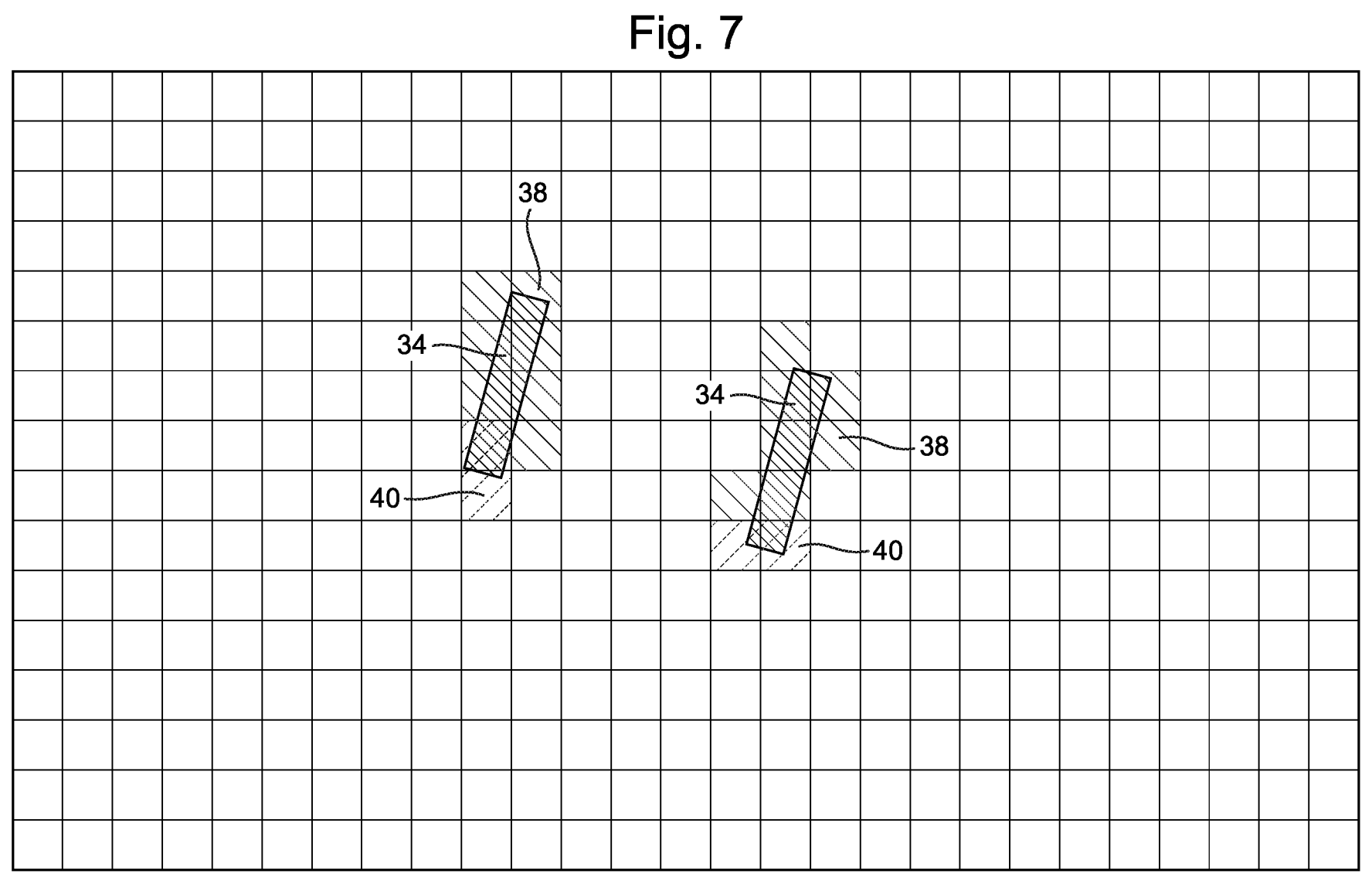

FIG. 6 is a schematic diagram illustrating the workspace elements 36 that are hit by the fingers 34 when operated in the open position, and FIG. 7 illustrates the uniquely mapped workspace elements 38 that are hit by the fingers 34 in the open position, i.e. those elements 38 that are hit only as a result of the fingers 34 being present, rather than those 'overlapping' elements 40 already hit due to the presence of the palm 30. Thus, only information relating to the set of these additional workspace elements 38 need be stored in the mapping, because the elements 38 already stored within the mapping for the palm 30 are otherwise redundant.

Figure 8:
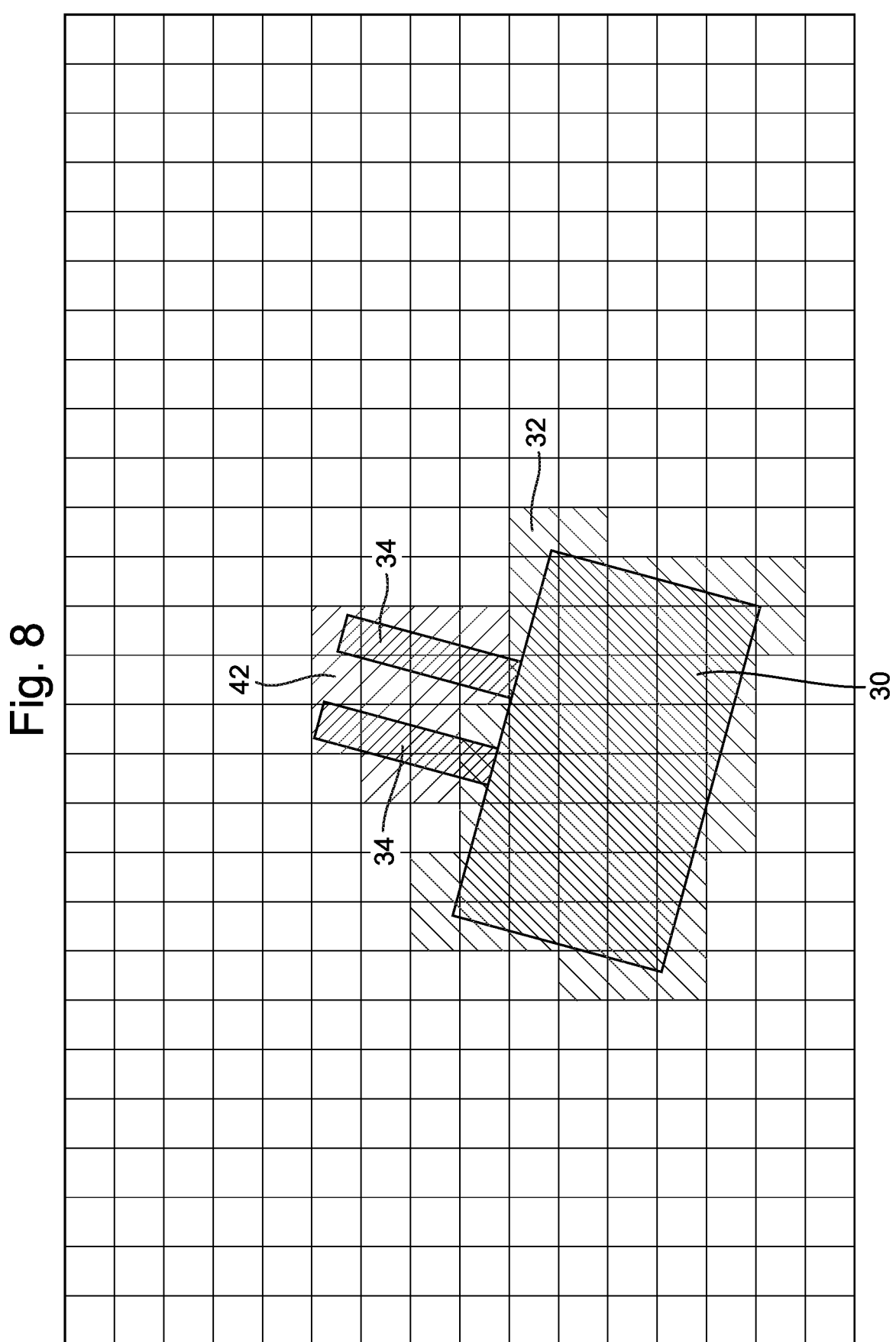
FIG. 8 is a schematic diagram illustrating the workspace elements hit by fingers of the gripper of FIG. 5 in a closed position.
Figure 9:
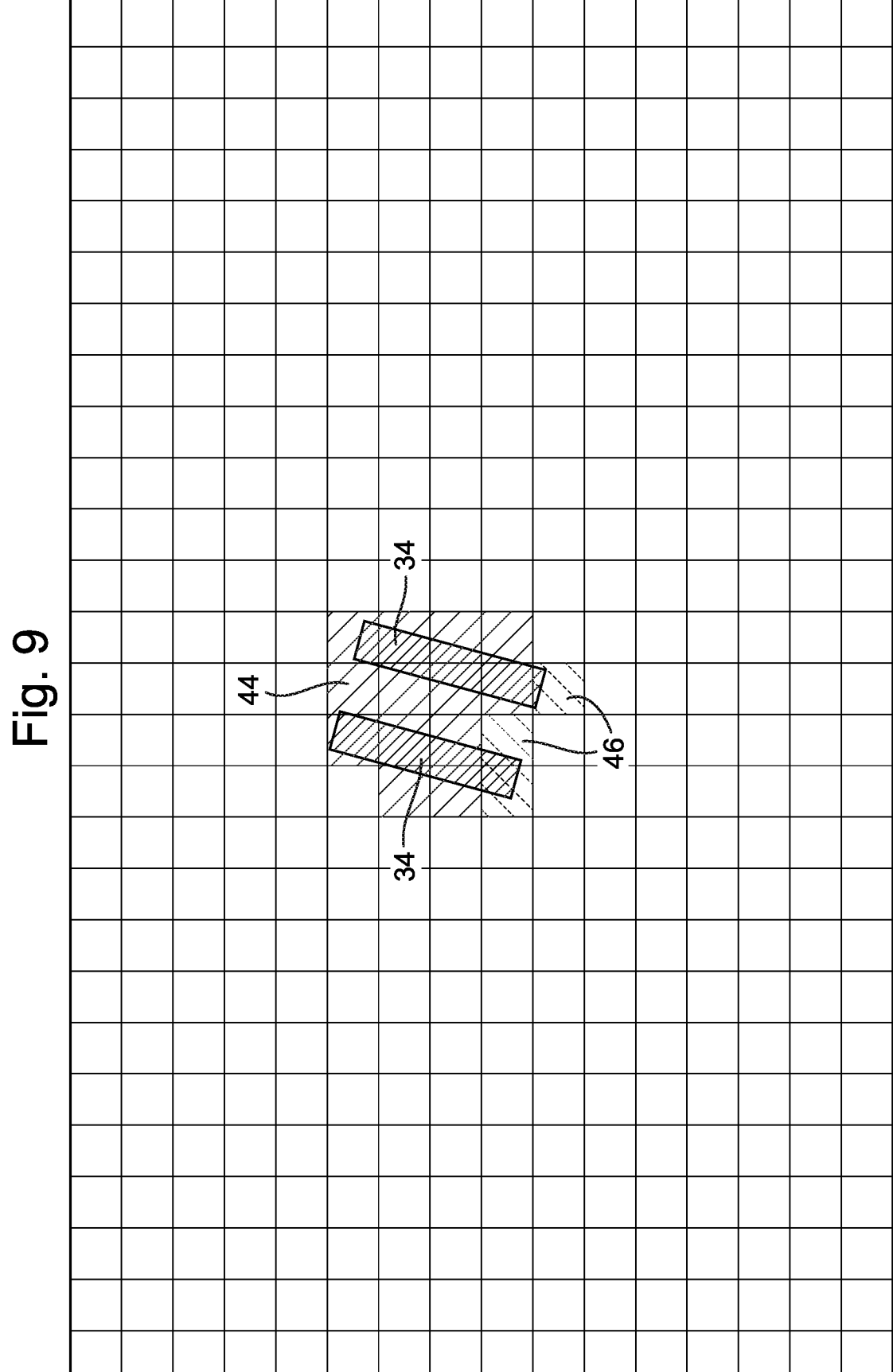
FIG. 9 is a schematic diagram illustrating the uniquely mapped workspace elements hit by fingers of the gripper in the closed position as shown in FIG. 8.

FIG. 8 is a further schematic diagram illustrating the workspace elements 42 that are hit by the fingers 34 when operated in the closed position, and FIG. 9 illustrates the uniquely mapped workspace elements 44 that are hit by the fingers 34 in the closed position, i.e. those elements 44 that are hit only as a result of the fingers 34 being present, rather than those 'overlapping' elements 46 already hit due to the presence of the palm 30. As before, only information relating to the set of these additional workspace elements 44 needs to be stored in the mapping for the closed fingers 34.

The mappings for the fingers 34 in the open and closed positions can then be stored in a library in memory as 'Part Maps' for that part (i.e. for the gripper) alongside the Link Map(s). These can then be selected from a library as appropriate depending on the current or planned state of the gripper for a given task. Advantageously, this avoids storing two complete mappings for the entire robot when the only difference in the workspace elements hit is due to the position of the fingers 34, where all other workspace element hits (i.e. due to the palm and the other links of the robot 2) are duplicated for both positions.

Edges might be a combined movement of several joints 12. However, for the lowest link that contributes to the combined movement, the movement is nothing more than a simple movement of that link, which is already stored for the corresponding simple edge. Thus, mappings for edges that correspond to combined movements are only stored for the higher links, while the mappings for simple edges for the lower links are reused. One might, for some applications, need only simple edges while combined edges may be needed for other, more advanced applications. Furthermore, the set of advanced edges needed might differ between applications. To further increase flexibility, the Link Maps for each combined edge can be stored separately and can be combined for online use as needed.

The size of all mappings when combined will be approximately the same as the size of one combined robot map. While the combination of the mappings for a given robot set-up may be slightly larger than a single mapping for the whole robot due to any stored overlapping workspace elements (e.g. where those at a join are stored in the mappings for both links either side of that joint), overall significant memory savings are made when one considers that in a prior art approach, whole robot mappings would need to be stored for each possible robot set-up and manipulated or carried object. Thus, using the principle of the present invention, a slight trade off in the memory requirement for the mapping of any single robot set-up may be negligible compared to the significant reductions in the overall storage space needed for storing all of the different combinations of roadmaps and links/parts.

All the of the mappings that extend from earlier mappings are valid for the particular lower links (and, where used, sub-roadmap) that they were generated with. The sub-roadmap should, however, be the same for all dimensions because this dictates the positions the mapped link ends up in. The kinematics for the underlying (or 'inner') links may not be changed because doing so would also alter the position in which the 'outer' link, or links, end up.

In other words, consider a robot having a set-up in which a gripper end effector is provided at the end of a robot arm constructed from two links (i.e. the equivalent of an upper arm 'first link', a lower arm 'second link', and a hand 'end effector'). The two links are covered by Link Map 1 and Link Map 2. A mapping for the end effector is valid for that particular set-up, however if the second link (the lower arm) is replaced with a different, third link (i.e. a different lower arm, say having a different shape or physical extent) covered by Link Map 3, a different mapping for the gripper end effector would be needed because the set of partially occupied workspace elements may be different on account of the changes earlier in the kinematic chain. However, the outermost links, parts, and dimensions (e.g. the end effector in the previous example) can be changed freely, since the mapping is not affected by what happens further out in the kinematic chain.

The flexibility of this mapping with regards to the roadmap dimensions is very useful because different applications have different resolution needs. Some might need high resolution while others might not. For example, a robot might have a 'wrist' that can provide rotational movement of the end effector. Depending on the application, precise rotational movement may be required, however in other applications only very 'crude' rotation may be required (e.g. between two different positions, separated by 180° such as 'palm up' and 'palm down').

In such a situation, with e.g. a 6-DOF robot, two different users using the system for their different applications could use the same mappings for the first three links while using different mappings only for the three outer links.

As a large number of different mappings can be precomputed using the present invention, this will save a lot of storage space and computation time since mappings can be reused for different links. Furthermore, the chosen gripper, which will vary greatly, does not affect the mapping for the robot and can be generated separately.

As the robot 2 can pick different objects during run time, the extent of the robot 2 (including objects manipulated by the robot 2) will generally also change online, i.e. during operation of the robot 2. The modular mapping approach of the present invention gives the flexibility of using the mappings for the appropriate links and parts that are present, for each given time during operation, without the need to change out the mapping for the entire robot 2.

Very often, in robotic applications, the robot may need to handle a large range of objects in different sizes and shapes. For example, in a warehouse, a robot may have to pick up lots of different components for distribution (e.g. goods from an online store to be delivered to customers), where each of these components is a different shape or size (i.e. they have different physical extents). Similarly, in a recycling plant, a robot may have to sort different types of objects (e.g. glass bottles, aluminium cans, cardboard, etc.) having different physical extents.

As a mapping for all parts of the robot 2, included those parts carried or manipulated by the robot 2, managing a set of maps for a large number of objects quickly becomes infeasible. One solution would be to consider all objects as being equivalent to the object having the greatest physical extent that the robot will ever have to manipulate. However, this is generally not efficient as it may—for example—result in the robot 2 taking a longer path because it assumes the object it is carrying will hit an obstacle, but in reality the manipulated object is far smaller and the obstacle would not have actually been hit if a more preferable (e.g. shorter) path allowed by the smaller object had been followed. Furthermore, taking such a conservative approach (i.e. by considering objects all to be as large as the largest possible object) may lead to what should be feasible goals being written off as infeasible due to the 'detection' of false collisions.

Furthermore, generating all of the necessary maps for all the different combinations of robot set-ups and manipulated objects can take a significant amount of time. Such a prior art approach also makes the system less flexible to changes in the setup and to new tasks. To solve this problem, embodiments of the present invention introduce a 'Layered Map' approach, as outlined below with reference to FIGS. 10 to 12.

Figure 10:
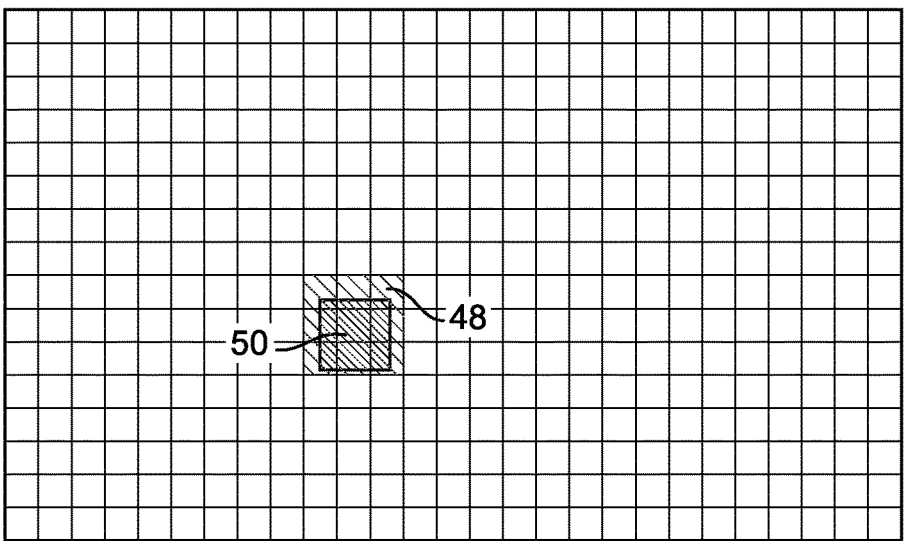
FIG. 10 is a schematic diagram illustrating the workspace elements hit by a small object.

FIG. 10 is a schematic diagram illustrating the workspace elements 48 hit by a small object 50, i.e. the elements 48 that are at least partially in collision with that small object 50. For larger objects, these can be 'grown out' from the small object, as shown in FIGS. 11 and 12, where only the additional workspace elements hit are stored.

Figure 11:
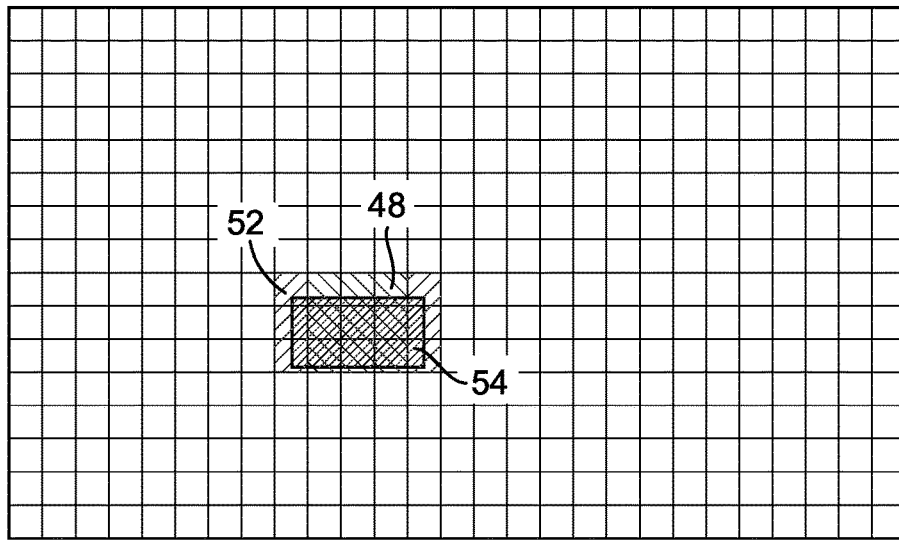
FIG. 11 is a schematic diagram illustrating the workspace elements hit by a medium object as an additional 'onion' layer.
Figure 12:
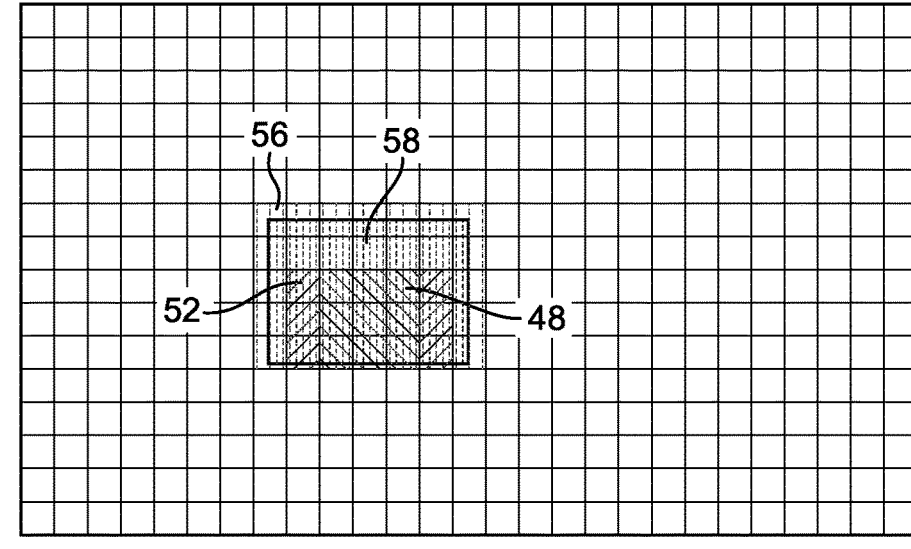
FIG. 12 is a schematic diagram illustrating the workspace elements hit by a large object as a further additional 'onion' layer.

Specifically, FIG. 11 is a schematic diagram illustrating the workspace elements 52 hit by a medium object 54, expanded from the small object 50, as an additional 'onion' layer. FIG. 12 illustrates the addition of the workspace elements 56 hit by a large object 58, expanded from the medium object 54, as a further additional 'onion' layer.

Thus, similar to how an onion is built up from various layers, a part can be modularly constructed from the appropriate layers. As a result, instead of making a single map for each part as a whole, the layered map approach constructs several maps for each layer that together maps the entire part. Thus, if the medium object 54 is to be considered for a path planning process, the appropriate mapping can be constructed from the mapping for the small object 50 plus the 'add-on' mapping for the extra workspace elements 52 hit by the medium object 54 'over and above' those elements 48 hit by the small object 50. Similarly, the large object 58 can be considered by combining the mappings for all three objects 50, 54, 58.

With this strategy it is possible to map a large range of parts without wasting memory storage on redundant information.

The mappings are created for a single layer at a time. Each layer is created in the same manner as described previously (i.e. in relation to chains of links and/or end effectors), where each layer working outwards extends from the immediately previous inner layer. Each mapping only stores the hits that are unique to the given layer, i.e. not any hits for any of the inner layers. As a result, for a single configuration, the number of hits for all layers making up a part may be exactly the same as for one single map of the entire part as a whole. Since each layer can be smaller or thinner than a single voxel, a given node or edge might produce no unique hits.

As the mapping for each layer stores only unique hits, each 'Layer Map' can be used only in combination with the underlying layer maps. Thus, in construction (i.e. when devising the library of mappings for the various parts), a design decision must be made regarding how to 'grow' the parts. It will be appreciated that this will depend on the particular application and the design requirements for that particular implementation, and so this is not discussed further here.

If a separation distance between the layers is more than the maximum diagonal length of the workspace elements, there will never be any workspace elements (e.g. voxels) that both layers touch at the same time, and so they will never have shared hits and all hits for any of the layers are unique relative to the other layers.

Thus, the present invention provides an advantageous arrangement in which, a layered map of several parts can be loaded to a local memory, e.g. a memory of a parallel processing unit such as a GPU, where the memory requirements are more optimal than with a conventional approach in which separate mappings are made for the whole robot with each part. The solution of the present invention provides a flexible approach in which different parts can be picked and different end effectors (e.g. grippers) can be used.

A further advantage of the present invention is that the exact parts to be picked do not need to be known when generating the mapping. A large set of shapes can be created with very little overhead memory and combined online to capture the current part that is being (or is planned to be) manipulated. For example, a sensor might determine that an unknown object to be manipulated is bigger than the small object 50 but fits within the boundaries of the medium object 54, and so can use the appropriate mappings for the medium object.

Invalidation or labelling of the roadmap (e.g. to discard nodes and/or edges that result in a collision with an obstacle 16, 18, 20, 22) can be carried out in a similar way to conventional approaches known in the art per se, however the modular mapping approach described herein makes the invalidation process more memory efficient for execution by a parallel processing unit, e.g. a GPU.

The labels of nodes and edges can be stored in a 'label array' or some other suitable storage format, which can be stored in the memory of a parallel processing unit (e.g. a GPU). The labels used may be as simple as corresponding to whether the workspace element (e.g. voxel) is occupied or free (i.e. binary labels), or more complex labels may be used (e.g. a 'risk' number or likelihood of occupation, a distance to objects, and/or a time when an object is expected to be present could be used as a label).

In the array, the labels can be hierarchically stored based on the robot link causing the intersection with the workspace element (voxel), which is particularly useful when using a structured roadmap. With such a hierarchical structure, when a link close to the base intersects a labelled workspace element (voxel) for a given node or edge, this means that all configurations and edges with the same configuration up to that link are all implicitly given the same label. Any labelling of the base node/edge implicitly labels all arm nodes/edges.

With the modular mapping approach described herein, all of the mappings that correspond to a particular roadmap, robot set-up and physical extent, the kinematics, and the workspace can be loaded to the GPU (or other parallel processing unit) at start-up.

The labelling of the workspace elements (i.e. whether they are labelled as occupied, free, or some other status) is checked and, based on the label, the corresponding node/edge (and, in the case of a structured roadmap, all implicitly stored nodes/edges) can be labelled accordingly. The invalidated or labelled roadmap may then be used to perform a graph search, to obtain a path, where invalidated nodes and edges are avoided. Other labels (i.e. non-binary labels) may be used, for example, to adjust the cost of moving through that edge or node, and the graph search may use a cost function to find an 'optimal' path (where the costs may relate to e.g. risk, energy consumption, speed restrictions, etc.).

Figure 13:
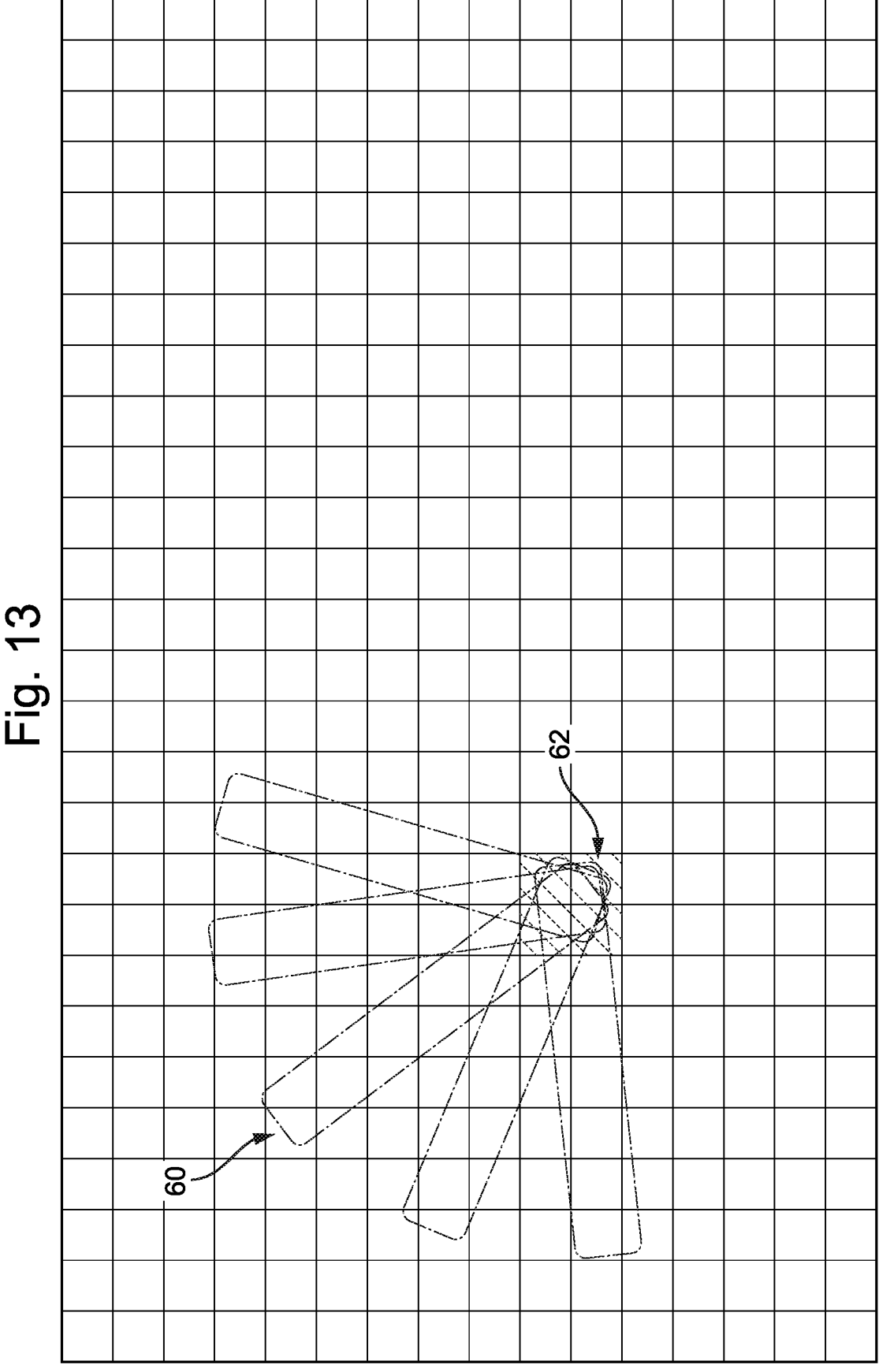
FIG. 13 is a schematic diagram illustrating the workspace elements that are hit by a robot link having axial symmetry.

As shown in FIG. 13, a particular joint may be arranged such that a big part of the link hits the same area regardless of the joint angle. These hits may be stored only once, implicitly for all joint angles to provide further memory savings. When using a structured roadmap, this can be done by considering these hits as part of the lower link. Since the mapping is modular, this is still implicitly stored in the map for the current link but is part of the mapping for the 'lower' or 'inner' link that caused the hit.

In this particular example, a link 60 rotates around the axis of a joint at one end, as shown by the different rotational states in dashed lines in FIG. 13. The workspace elements hit 62 by the joint are, in this case, the same in all rotational states of the link 60. As such, these elements 62 need only be stored once, and are determined to be hit for all rotational states of that link 60.

It can be seen, therefore, that embodiments of the present invention provide an improved method of performing motion planning for a robot in which the mappings for the different objects (e.g. robot links, end effectors, and/or external objects to be manipulated by the robot) are broken up into 'modular' mappings that can be combined as appropriate. Such an approach may provide significant improvements to the memory and/or computational requirements for performing motion planning compared to conventional approaches that require mappings of an entire robot to be generate.

Those skilled in the art will appreciate that the specific embodiments described herein are merely exemplary and that many variants within the scope of the invention are envisaged.

The invention claimed is:

1. A method of generating a path for a robot, wherein the robot is arranged to operate between a plurality of states in a workspace, said workspace being represented by a plurality of discretized workspace elements, wherein each of said states is connected to at least one other state via at least one respective transition, wherein the method comprises:
   generating or receiving a first model;
   determining a first set comprising one or more workspace elements that are at least partially in collision with the first model for each of the plurality of states and the respective transition(s) between those states;
   generating a first mapping comprising information regarding said first set and the respective plurality of states and respective transition(s) for which the first model is at least partially in collision with the respective workspace elements in the first set, and storing said first mapping in a first memory area;
   generating or receiving a second model that extends from the first model;
   determining a second set comprising one or more further workspace elements, additional to those in the first set, that are at least partially in collision with the second model for each of the plurality of states and the respective transition(s) between those states; and
   generating a second mapping comprising information regarding said second set and the respective plurality of states and respective transition(s) for which the second model is at least partially in collision with the respective workspace elements in the second set, and storing said second mapping in a second memory area;
   combining at least the first and second mappings to provide the path; and outputting the path to the robot, the path comprising instructions for moving the robot.

2. The method as claimed in claim 1, wherein the first model comprises a representation of a first link of the robot.

3. The method as claimed in claim 1, wherein the second model comprises a representation of a second link of the robot.

4. The method as claimed in claim 1, further comprising:
   generating or receiving an additional model that extends from at least one of the first or second models;
   determining an additional set comprising one or more further workspace elements, additional to those in the first and second sets, that are at least partially in collision with the additional model for each of the plurality of states and the respective transition(s) between those states; and
   generating an additional mapping comprising information regarding said additional set and the respective plurality of states and respective transition(s) for which the additional model is at least partially in collision with the respective workspace elements in the additional set, and storing said additional mapping in an additional memory area.

5. The method as claimed in claim 4, wherein the additional model comprises a representation of an additional link of the robot.

6. The method as claimed in claim 1, wherein the step of determining the set of workspace elements at least partially in collision with each model comprises checking the states and transitions that are allowed by the respective dimension of movement afforded by said model.

7. The method as claimed in claim 1, wherein the step of determining the set of workspace elements at least partially in collision with each model comprises checking the states and transitions for collisions with a static obstacle and/or for self-collisions.

8. The method as claimed in any preceding claim, wherein the first and second memory areas are each within a memory.

9. The method as claimed in claim 1, further comprising removing one or more workspace elements from the second set that are in first set.

10. The method as claimed in claim 1, wherein one or more workspace elements that are at least partially in collision with more than one of the models are included in the sets corresponding to each of said models.

11. The method as claimed in claim 1, wherein one or more workspace elements that are at least partially in collision with more than one of the models are included in the set corresponding to only one of said models.

12. The method as claimed in claim 1, comprising generating a base mapping comprising information regarding one or more workspace elements that are at least partially in collision with a static part of the robot.

13. The method as claimed in claim 1, wherein the information stored for one or more of the mappings may comprise a plurality of points of interest.

14. The method as claimed in claim 1, comprising discretizing the workspace into workspace elements of different shapes and/or sizes.

15. The method as claimed in claim 1, wherein one or more of the models is at least partially axially symmetric, the method comprising storing information regarding the workspace elements partially occupied identically for multiple rotational states in a mapping for that model only once.

16. The method as claimed in claim 1, wherein only workspace element information relating to workspace elements at least partially in collision with the first and/or second model and the corresponding states and/or transitions that result in the collisions for one direction of a transition are stored in the corresponding set.

17. The method as claimed in claim 1, wherein only the workspace element information relating to workspace elements at least partially in collision with the first and/or second model and the corresponding states and/or transitions that result in the collisions for a transition that are not found in any of the states to which said transition connects are stored in the corresponding set.

18. The method as claimed in claim 1, wherein workspace element information relating to workspace elements at least partially in collision with the first and/or second model and the corresponding states and/or transitions that result in the collisions that correspond to combined movements are only stored for the higher links, while the simple transitions for the lower links are reused.

19. A motion planning system arranged to generate a path for a robot, wherein the robot is arranged to operate between a plurality of states in a workspace, said workspace being represented by a plurality of discretized workspace elements, wherein each of said states is connected to at least one other state via at least one respective transition, wherein the motion planning system is arranged to:

generate or receive a first model;

determine a first set comprising one or more workspace elements that are at least partially in collision with the first model for each of the plurality of states and the respective transition(s) between those states;

generate a first mapping comprising information regarding said first set and the respective plurality of states and respective transition(s) for which the first model is at least partially in collision with the respective workspace elements in the first set, and store said first mapping in a first memory area;

generate or receive a second model that extends from the first model;

determine a second set comprising one or more further workspace elements, additional to those in the first set, that are at least partially in collision with the second model for each of the plurality of states and the respective transition(s) between those states; and generate a second mapping comprising information regarding said second set and the respective plurality of states and respective transition(s) for which the second model is at least partially in collision with the respective workspace elements in the second set, and store said second mapping in a second memory area;

combine at least the first and second mappings to provide the path; and output the path to the robot, the path comprising instructions for moving the robot.

20. A non-transitory computer-readable medium comprising instructions that, when executed by a processor, cause the processor to carry out a method of performing motion planning generating a path for a robot, wherein the robot is arranged to operate between a plurality of states in a workspace, said workspace being represented by a plurality of discretized workspace elements, wherein each of said states is connected to at least one other state via at least one respective transition, wherein the method comprises:

generating or receiving a first model;

determining a first set comprising one or more workspace elements that are at least partially in collision with the first model for each of the plurality of states and the respective transition(s) between those states;

generating a first mapping comprising information regarding said first set and the respective plurality of states and respective transition(s) for which the first model is at least partially in collision with the respective workspace elements in the first set, and storing said first mapping in a first memory area;

generating or receiving a second model that extends from the first model;

determining a second set comprising one or more further workspace elements, additional to those in the first set, that are at least partially in collision with the second model for each of the plurality of states and the respective transition(s) between those states;

generating a second mapping comprising information regarding said second set and the respective plurality of states and respective transition(s) for which the second model is at least partially in collision with the respective workspace elements in the second set, and storing said second mapping in a second memory area;

combining at least the first and second mappings to provide the path; and output the path to the robot, the path comprising instructions for moving the robot.

* * * * *